US011645068B2

(12) United States Patent
Hu et al.

(10) Patent No.: US 11,645,068 B2
(45) Date of Patent: May 9, 2023

(54) METHOD FOR IMPLEMENTING FUNCTION JUMP, APPARATUS, AND COMPUTER STORAGE MEDIUM

(71) Applicant: Huawei Technologies Co., Ltd., Shenzhen (CN)

(72) Inventors: Leibin Hu, Shenzhen (CN); Congyang Wen, Nanjing (CN); Hui Wang, Hangzhou (CN); Jian Ma, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 219 days.

(21) Appl. No.: 17/235,061

(22) Filed: Apr. 20, 2021

(65) Prior Publication Data
US 2021/0240467 A1 Aug. 5, 2021

Related U.S. Application Data

(63) Continuation of application No. PCT/CN2020/071347, filed on Jan. 10, 2020.

(30) Foreign Application Priority Data

May 30, 2019 (CN) .......................... 201910465987.7

(51) Int. Cl.
 *G06F 9/44* (2018.01)
 *G06F 8/656* (2018.01)
 (Continued)

(52) U.S. Cl.
 CPC .............. *G06F 8/656* (2018.02); *G06F 8/658* (2018.02); *G06F 9/3004* (2013.01); *G06F 9/328* (2013.01)

(58) Field of Classification Search
None
See application file for complete search history.

(56) References Cited

U.S. PATENT DOCUMENTS 6,311,227 B1 * 10/2001 Tabuchi .............. G06F 9/44521
 712/E9.083
6,658,657 B1 * 12/2003 Lueh ...................... G06F 9/449
 717/148

(Continued)

FOREIGN PATENT DOCUMENTS

CN 101561764 A 10/2009
CN 101882094 A 11/2010
(Continued)

OTHER PUBLICATIONS

Ratsgo's Blog "Hashing, Hash Function, and Hash Table," Oct. 25, 2017, 18 pages (with an English translation).
(Continued)

*Primary Examiner* — Anna C Deng
(74) *Attorney, Agent, or Firm* — Conley Rose, P.C.

(57) ABSTRACT

A method for implementing a function jump includes receiving a first function, searching, for an address of the first function, a first data structure in which addresses of a plurality of functions are stored, where a patch function used to replace the first function is available when the address of the first function is found, searching a second data structure for an address of the patch function based on the address of the first function, where correspondences between a plurality of functions and patch functions of the functions are stored in the second data structure, jumping from the first function to the patch function of the first function based on the address of the patch function of the first function, and executing the patch function of the first function to respond to the call to the first function.

17 Claims, 15 Drawing Sheets

(51) Int. Cl.
*G06F 8/658* (2018.01)
*G06F 9/30* (2018.01)
*G06F 9/32* (2018.01)

(56) References Cited

U.S. PATENT DOCUMENTS

| | | | | |
|---|---|---|---|---|
| 7,069,549 | B2* | 6/2006 | Charnell | G06F 9/449 |
| | | | | 712/E9.082 |
| 8,015,558 | B1* | 9/2011 | Beloussov | G06F 8/656 |
| | | | | 717/175 |
| 8,468,516 | B1* | 6/2013 | Chen | G06F 8/656 |
| | | | | 717/169 |
| 10,795,659 | B1* | 10/2020 | Kinsburskiy | G06F 8/65 |
| 2006/0242627 | A1 | 10/2006 | Wygodny et al. | |
| 2010/0306746 | A1 | 12/2010 | Barua et al. | |
| 2011/0107070 | A1 | 5/2011 | Barbulescu et al. | |
| 2011/0214110 | A1* | 9/2011 | Baron | G06F 8/443 |
| | | | | 717/153 |
| 2012/0066484 | A1* | 3/2012 | Yin | G06F 8/656 |
| | | | | 712/E9.082 |
| 2016/0019054 | A1 | 1/2016 | Bar-Or | |
| 2019/0146777 | A1* | 5/2019 | Liu | G06F 40/157 |
| | | | | 717/168 |

FOREIGN PATENT DOCUMENTS

| | | |
|---|---|---|
| CN | 102467394 A | 5/2012 |
| CN | 104239082 A | 12/2014 |
| CN | 105607937 A | 5/2016 |
| CN | 106610857 A | 5/2017 |
| CN | 107797820 A | 3/2018 |
| CN | 105630557 B | 12/2018 |
| JP | H09146772 A | 6/1997 |

OTHER PUBLICATIONS

Cheng, Y., et al., "Study on Software Hot Patching for Embedded Network System", College of Computer, Huazhong University of Science and technology, Wuhan 43007 China, vol. 30 No. 1, Jan. 2013, 5 pages.

* cited by examiner

Second hash table

| Hash value of an address of a first function | Second struct of the first function |
|---|---|
| ... | ... |
| Hash value of an address of a function N | Second struct of the function N |

METHOD FOR IMPLEMENTING FUNCTION JUMP, APPARATUS, AND COMPUTER STORAGE MEDIUM

CROSS-REFERENCE TO RELATED APPLICATIONS

This application is a continuation of International Patent Application No. PCT/CN2020/071347 filed on Jan. 10, 2020, which claims priority to Chinese Patent Application No. 201910465987.7 filed on May 30, 2019. The disclosures of the aforementioned applications are hereby incorporated by reference in their entireties.

TECHNICAL FIELD

This application relates to the computer field, and more further, to a method for implementing a hotfix.

BACKGROUND

A hotfix refers to some code that can fix software vulnerabilities, and is a rapid and low-cost manner for fixing defects of a product software version. A main advantage of the hotfix is to fix defects of a current software version of a device without rebooting the device.

A hotfix solution is mainly a function jump-based solution, that is, "a replacement function (or a hotfixed old function)" jumps to a new function for execution A LINUX kernel is used as an example. The LINUX kernel implements a hotfix mechanism by using a function tracer (ftrace) and a livepatch component. In an initialization phase of the livepatch, the livepatch registers a struct fops for each hotfixed old function to store information such as an address of the hotfixed old function, a function stack of the new function, and a callback function of the livepatch. All hotfixed old functions are managed by using a single linked list. In a function jump phase, when the old function is called, the ftrace traverses the single linked list to search for a struct corresponding to the address of the old function, and obtains a pointer of the callback function of the livepatch and an address of the struct and that are stored in the struct. The livepatch searches for, based on the address of the struct, an address of the new function corresponding to the old function, executes the new function, and completes the jump from the old function to the new function, thereby fixing the old function. It can be learned from the procedure of the function jump of the livepatch that, the livepatch registers a struct for each hotfixed old function, and uses the single linked list to manage the structs of all hotfixed old functions. Consequently, the single linked list is lengthened as a quantity of hotfix functions increases. However, the ftrace needs to traverse the single linked list to search for a callback function corresponding to a function. A longer linked list indicates a longer traversal time and a longer time for a function jump, causing comparatively high performance overheads.

SUMMARY

This application provides a method for implementing a function jump, so that a single linked list is shortened, and a time for the function jump is reduced.

According to a first aspect, this application provides a method for implementing a function jump, where the method includes receiving a call instruction for a first function, where the call instruction may include an address of the first function, confirming that an address of the first function has been stored in a first data structure, where addresses of a plurality of functions are stored in the first data structure, any one of the plurality of functions is configured to replace a patch function of the function, and replacement means that the old function is replaced with the patch function to respond to the call to the old function, searching a second data structure for an address of the patch function of the first function based on the address of the first function, where the patch function of the first function is registered to replace the first function, correspondences between addresses of a plurality of functions and patch functions of the plurality of functions are stored in the second data structure, and a patch function of any one of the plurality of functions is registered to replace the function, and jumping, based on the address of the patch function of the first function, from the first function to the patch function of the first function for execution, to respond to the call instruction, and executing the patch function of the first function. Confirming that an address of the first function has been stored in a first data structure means to confirm that the addresses of the plurality of functions include the address of the first function. That the address of the first function is stored in the first data structure indicates that the first function is the old function that needs to be replaced by the patch function, and therefore the address of the patch function needs to be found to perform the function jump. A data structure is a manner of storing and organizing data in a computer.

In an implementation, the first data structure is a first hash table, and the addresses of the plurality of functions are stored in the first hash table. A hash table is a data structure that directly accesses a memory storage location based on a key value. To be specific, for the hash table, data that needs to be queried is mapped to a location in the table by calculating a function about a key value, for record access. The first hash table may indicate a correspondence between an address of a function and a hash value of the address of each of a plurality of functions.

In an implementation, the method further includes determining the first hash table by using a struct in which an address of the first hash table is stored, where a pointer pointing to the struct in which the address of the first hash table is stored is included in a first struct. The first struct includes a pointer, and the pointer points to the struct in which the address of the first hash table is stored. A struct is a data structure and is an aggregate data type. The struct may be declared as a variable, a pointer, or an array, to implement a comparatively complex data structure. The struct is also a set of elements, where these elements are referred to as members of the struct.

Compared with other approaches in which a plurality of structs are registered, and an address of only one old function is stored in each struct. In this application, the addresses of the plurality of old functions are stored in the first data structure. In this way, a length of a single linked list is shortened, a time consumed by searching for the address of the first function is reduced, and further a time required for the function jump is further reduced. This improves system performance In an implementation, each of the plurality of functions corresponds to a second struct, and an address of a patch function of each function is stored in the second struct of the function. A second hash table is used to store correspondences between addresses of the plurality of functions and second structs of the plurality of functions. Searching a second data structure for an address of the patch function of the first function based on the address of the first function includes searching the second hash table for a second struct corresponding to the address of the first function based on the address of the first function, and obtaining the address of the patch function of the first function from the found second struct corresponding to the address of the first function. A correspondence between an address of an old function and a second struct of the old function is managed by using the second hash table, so that a time consumed for searching for a new function can be reduced during searching for an address of the new function based on the address of the old function. Further, the second struct of the first function can be quickly found in the second hash table based on a hash value of the address of the first function, and further the address of the patch function of the first function is obtained.

In an implementation, the address of the first function is added to the first data structure. Optionally, the address of the first function may be added to the first hash table. After a patch package is parsed in a system, the patch function is registered for the old function based on the address of the patch function and the address of the old function that are in the patch package, and a jump is established from the old function to the patch function. In the other approaches, one struct is registered for each old function, and an address of the old function is stored in the struct. However, in this application, the address of the old function is added to a data structure. Optionally, the address of the old function is added to the first hash table. This shortens the length of the single linked list.

In an implementation, the method further includes, in response to a rollback instruction for the first function, based on the second hash table and the address of the first function, searching the second struct of the first function for the address of the patch function of the first function and deleting the address of the patch function of the first function, where the rollback instruction is used to undo replacement of the first function with the patch function of the first function, that is, to roll back to a state before the first function is replaced with the patch function. For example, functions 2, 3, and 4 are patch functions that are sequentially used for fixing a function 1, and the function 4 is a patch function that is used when the function 1 is fixed last time. When a rollback instruction of the function 1 is received, based on an address of the function 1, an address of the function 4 is searched for in the second hash table and the address of the function 4 is deleted. The function 4 is rolled back to a state before the function is replaced with the function 4, where the state means that the function 1 is replaced with the function 3. When the first function is rolled back, the second hash table is used to manage the addresses of the plurality of functions and the second structs of the plurality of functions, so that a time consumed for searching for the patch function of the first function can be reduced.

In another implementation, the method further includes, if the rollback instruction of the first function is received when a read operation is performed on the second hash table, after the read operation is performed on the second hash table, the following steps are performed based on the address of the first function, searching the second hash table for the address of the patch function of the first function and deleting the address of the patch function of the first function, where the rollback instruction is used to undo replacement of the first function with the patch function of the first function. A lock mechanism may be set for a hash table. When a thread or a process reads the hash table, another thread or process are prohibited from modifying the hash table.

In another implementation, the data structure that is used to store the correspondence between the address of the first function and the address of the patch function of the first function may be customized. Different data structures have respective advantages and disadvantages. Switching between data structures needs to be implemented by modifying code to recompile a kernel. The switching is complex and there are modification risks. In this application, a plurality of sets of data structures may be stored, and switching is quickly implemented by using a related kernel to compile a parameter, without modifying code each time. In this way, a specific data structure may be determined to be used depending on a scenario, and development costs are reduced.

According to a second aspect, this application provides an apparatus for implementing a function jump. The apparatus includes a receiving unit and a processing unit, where the receiving unit is configured to receive a call instruction for a first function, where the call instruction includes an address of the first function, and the processing unit is configured to confirm that an address of the first function has been stored in a first data structure, where addresses of a plurality of functions are stored in the first data structure, search a second data structure for an address of a patch function of the first function based on the address of the first function, where the patch function of the first function is registered to replace the first function, and correspondences between addresses of a plurality of functions and patch functions of the plurality of functions are stored in the second data structure, and jump, based on the address of the patch function of the first function, from the first function to the patch function of the first function for execution, to respond to the call instruction.

In another implementation, the first data structure is a first hash table.

In another implementation, the processing unit is further configured to determine the first hash table by using a struct in which an address of the first hash table is stored, where a pointer pointing to the struct in which the address of the first hash table is stored is included in a first struct.

In another implementation, each of the plurality of functions corresponds to a second struct, and an address of a patch function of each function is stored in the second struct of the function, a second hash table is used to store correspondences between addresses of the plurality of functions and second structs of the plurality of functions, and the processing unit is configured to search the second hash table the second struct corresponding to the address of the first function based on the address of the first function, where the second hash table is used to store the correspondences between the addresses of the plurality of functions and the second structs of the plurality of functions, the second data structure includes a plurality of second structs, and a correspondence between an address of one of a plurality of functions and a patch function of the function is stored in each of the plurality of second structs, and obtain the address of the patch function of the first function from the found second struct corresponding to the address of the first function.

In another implementation, the processing unit is further configured to add the address of the first function to the first data structure.

In another implementation, the processing unit is further configured to in response to a rollback instruction for the first function, based on the second hash table and the address of the first function, search the second struct of the first function for the address of the patch function of the first function and delete the address of the patch function of the first function, where the rollback instruction is used to undo replacement of the first function with the patch function of the first function.

In another implementation, the processing unit is further configured to if the rollback instruction of the first function is received when a read operation is performed on the second hash table, after the read operation is performed on the second hash table, the following steps are performed based on the address of the first function and the second hash table, searching for the address of the patch function of the first function and deleting the address of the patch function of the first function, where the rollback instruction is used to undo replacement of the first function with the patch function of the first function.

According to a third aspect, this application provides a computer system, where the system includes a processor and a memory. The memory is configured to store a computer program, and the processor is configured to execute the computer program to implement the method described in any one of the first aspect and the implementations.

According to a fourth aspect, this application provides a computer-readable storage medium, and a computer program is stored in the computer-readable storage medium. When the computer program is called by a processor, the method described in any one of the first aspect and the implementations is implemented.

According to a fifth aspect, this application provides a computer program product, and the computer program product includes a computer program. When the computer program is called by a processor, the method described in any one of the first aspect and the implementations is implemented.

According to a sixth aspect, this application provides a data structure. The data structure includes a pointer of a callback function, the pointer points to a struct in which an address of a first hash table is stored. Addresses of a plurality of functions are stored in the first hash table. The pointer of the callback function points to the callback function, and the callback function is used to perform the operations of searching for an address of a patch function of a function based on an address of the function, and jumping, based on the address of the patch function of the function, from the function to the patch function of the function for execution.

DESCRIPTION OF EMBODIMENTS

The following describes the technical solutions in the embodiments of this application with reference to the accompanying drawings in the embodiments of this application. It is clearly that the described embodiments are merely some rather than all of the embodiments of this application.

"A plurality of" mentioned in the embodiments of this application means two or more. In addition, it should be understood that in descriptions of this application, terms such as "first" and "second" are merely used for differentiation and description, but should not be understood as an indication or an implication of relative importance or an indication or implication of an order.

Figure 1:
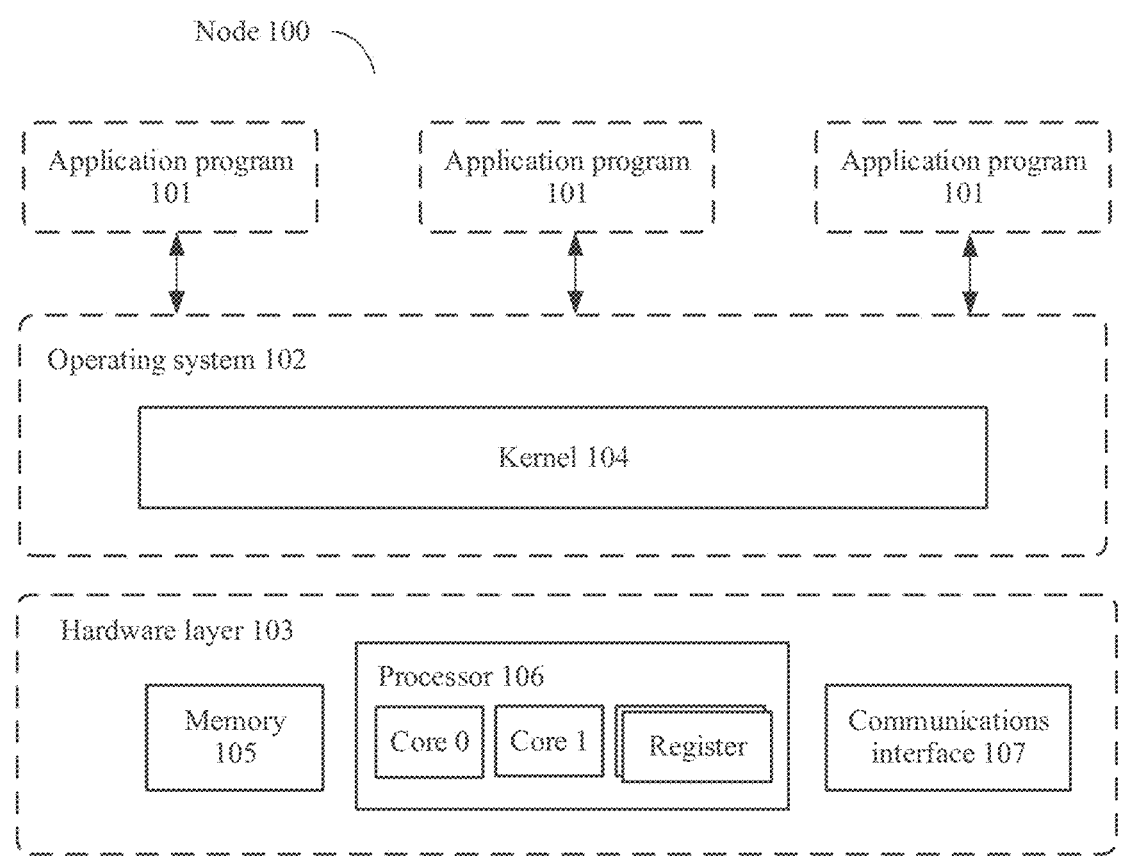
FIG. 1 is a schematic structural diagram of a node according to an embodiment of this application.

FIG. 1 is a schematic structural diagram of a node 100. The node 100 may include an application layer, an operating system 102, and a hardware layer 103. The application layer includes one or more application programs 101, the operating system 102 includes a kernel 104, and the hardware layer 103 includes a processor 106, a memory 105, and a communications interface 107. The operating system 102 is system software used to manage hardware resources and software resources.

The processor 106 is a control center of the node 100, and is connected to all components of the node 100 through various interfaces and buses. In some embodiments, the processor 106 may include one or more processing units, or may be referred to as a physical core. For example, the processor 106 in FIG. 1 includes a core 0 and a core 1. The processor 106 may further include a register, and the register may be configured to store an address of a function of the kernel 104. The processor 106 may be a central processing unit (CPU), the processor 106 may alternatively be another general-purpose processor, a digital signal processor (DSP), an application-specific integrated circuit (ASIC), a field-programmable gate array (FPGA) or another programmable logical device, a discrete gate or a transistor logic device, or a discrete hardware component. The general-purpose processor may be a microprocessor, or the processor 106 may be any conventional processor or the like.

A computer program is stored in the memory 105. The processor 106 is configured to execute a computer program in the memory 105, so as to implement a function defined by the computer program. The memory 105 is a non-volatile storage medium, and generally includes an internal storage device and an external storage device. The internal storage device includes but is not limited to a random-access memory (RAM), a read-only memory (ROM), a cache, or the like. The external storage device includes but is not limited to a flash memory, a hard disk, an optical disc, a Universal Serial Bus (USB) flash drive, or the like. The computer program is generally stored in the external storage device. Before executing the computer program, the processor loads the program from the external storage device to the internal storage device. The memory 105 may be independent and is connected to the processor 106 by using the bus. Alternatively, the memory 105 and the processor 106 may be integrated into a subsystem on chip.

The communications interface 107 is a transceiver apparatus such as a transceiver to implement communication between the node 100 and another device or a communications network.

A method provided in the embodiments of this application may be used to fix the kernel 104 in the operating system of the node 100.

Figure 2:
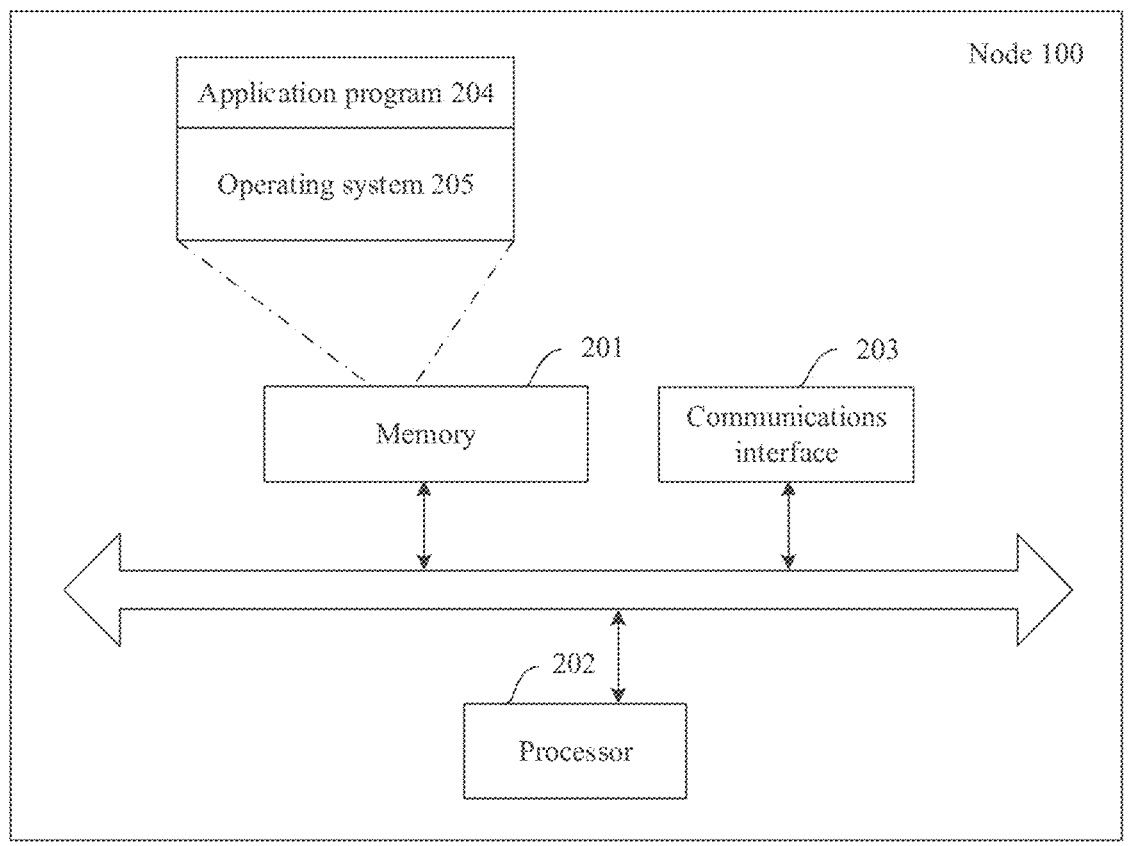
FIG. 2 is a schematic structural diagram of a node according to an embodiment of this application.

In an implementation, the node 100 may be a physical device such as a server or a terminal device. The terminal device may be a handheld device with a wireless connection function, or another processing device connected to a wireless modem. For example, the terminal device may be a mobile phone, a computer, a tablet computer, a personal digital assistant (PDA), a mobile Internet device (MID), a wearable device, an e-book reader, or the like. Alternatively, the mobile device may be a portable, pocket-sized, hand-held, computer built-in, or vehicle-mounted mobile device. In this implementation, a schematic structural diagram of the node 100 is shown in FIG. 2. The node 100 includes a memory 201, a processor 202, and a communications interface 203. The memory 201, the processor 202, and the communications interface 203 may respectively partially or completely correspond to the memory 105, the processor 106, and the communications interface 107 in FIG. 1. For implementations of the memory 201, the processor 202, and the communications interface 203 in FIG. 2, refer to corresponding descriptions in FIG 1. An operating system 205 and an application program 204 are stored in the memory 201, and data generated by the operating system 205 and data generated by the application program 204 that are in a running process may further be stored in the memory 201.

Figure 3:
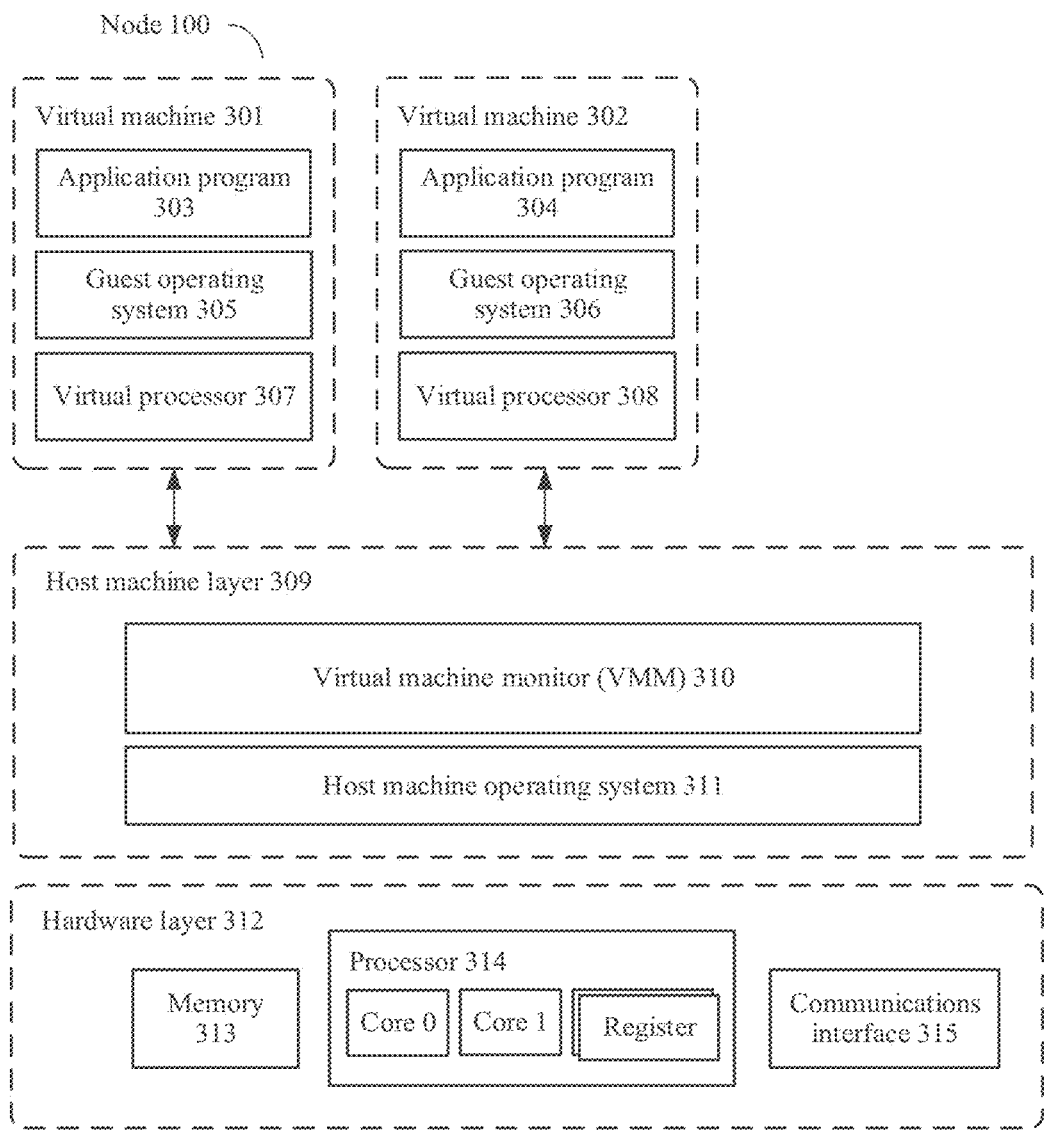
FIG. 3 is a schematic structural diagram of a node according to an embodiment of this application.

In another implementation, the node 100 may be a virtual computer. A virtual computer is a collective term of running environments virtualized by using software in all types of virtualization devices. The concept of virtual computer includes a virtual machine and a container. Virtualization, as a core technology in a cloud scenario, is used to share hardware resources to a plurality of users after the hardware resources are virtualized, so that the users can conveniently and flexibly use physical resources on a premise that security isolation is ensured, and utilization of the physical resources can be greatly increased. In this implementation, a schematic structural diagram of the node 100 is shown in FIG. 3. The node 100 includes a hardware layer 312, a host machine layer 309, and a virtualization layer. The virtualization layer includes a virtual machine 301 and a virtual machine 302. The hardware layer 312 includes a processor 314, a memory 313, and a communications interface 315. In another embodiment, there may be more or fewer virtual machines.

A virtual machine (VM): one or more virtual machines are simulated on a physical computer by using software. These virtual machines run in a completely isolated environment, and work like real computers. Guest operating systems (OS) (305 and 306 in FIG. 3) may be installed on the virtual machines (301 and 302 in FIG. 3), and one or more application programs (303 and 304 in FIG. 3) are run on the guest operating system. The virtual machine can further access a network resource. An application that is run on the virtual machine works like on the real computer.

A virtual computer is a collective term of running environments virtualized by using software in all types of virtualization devices. The concept of virtual computer includes a virtual machine and a container.

The host machine layer 309, as a management layer, is configured to manage and allocate hardware resources, present a virtual hardware platform to a virtual machine, and schedule and isolate a virtual machine. In some implementations, the host machine layer 309 includes a host machine operating system 311 and a virtual monitoring apparatus such as a virtual machine monitor (VMM) 310 or a hypervisor. The virtual machine monitor 310 may be deployed inside the host machine operating system 311, or may be deployed outside the host machine operating system 311. In some other implementations, the "host machine layer" may further include one privileged virtual machine (for example, a virtualization architecture Xen). The virtual hardware platform provides various hardware resources, such as a virtual processor, a virtual memory, a virtual disk, a virtual network interface card, and the like for virtual machines that run on the virtual hardware platform. The virtual computer runs on a virtual hardware platform that is prepared by the host machine layer for the virtual computer. In this application, the host machine layer is sometimes referred to as a host machine for short.

The hardware layer 312 is a hardware platform on which a virtualization environment is run. The hardware layer may include a plurality of types of hardware. For example, a hardware layer of a physical computer may include the processor 314 and the memory 313, and may further include the communications interface 315 such as a network interface card (NIC), and may further include an interrupt controller and an input/output (I/O) device. The processor 314 may include a plurality of physical cores, such as the core 1 and the core 0. The processor 314, the memory 313, and the communications interface 315 shown in FIG. 3 may be respectively partially or completely correspond to the processor 106, the memory 105, and the communications interface 107 in FIG. 1.

Virtual processors (for example, 307 and 308 in FIG. 3) are representations of physical processing units that are provided to a virtual computer for use in a sharing or slicing manner in a virtualization technology, for example, virtual CPUs (vCPU). For one virtual computer, one or more virtual processors may serve the virtual computer. When there is a plurality of virtual processors, usually one virtual processor is a master virtual processor, and the other virtual processors are slave virtual processors.

It should be understood that a virtual computer is equivalent to a standalone computer. Therefore, that the virtual computer performs an action may be considered as that a virtual processor performs the action. The virtual processor is implemented by using software. Therefore, that the virtual processor performs the action is actually that a physical processor or a physical core that is run in the virtual processor performs the action. In a plurality of embodiments of this application, the foregoing descriptions are selectively used to depending on technical expression habits of a corresponding scenario.

The host machine operating system 311 and the VMM 310 are deployed on the host machine. In another virtualization architecture, the VMM 310 is equivalent to the hypervisor or another type of virtual monitoring apparatus. The VMM 310 may be deployed inside the host machine operating system 311, or may be deployed separated from the host machine operating system 311. The VMM 310 is responsible for managing one or more virtual machines that run on the VMM 310. The host machine operating system 311 may be further LINUX, IOS, MICROSOFT, or another operating system.

The virtual machine (VM) includes a virtual hardware layer, the guest operating system, and a plurality of types of applications. The virtual hardware layer includes virtual hardware such as a virtual memory (not shown in the figure) and the virtual processor. As shown in FIG. 3, in this embodiment, the virtual machine 301 and the virtual machine 302 are included, and each virtual machine includes a virtual processor. The virtual processor is implemented by using a combination of software and hardware. Running of the virtual processor is actually implemented as follows. The physical core reads and runs a software program. For example, the physical core reads the software program and runs the software program in a specific mode (for example, a non-root mode of x86) of hardware-assisted virtualization of the physical core, so as to implement the virtual processor.

An operating system usually needs to be periodically updated to fix defects or vulnerabilities in an old version. When a developer finds a system problem or a detection module in the operating system finds a security vulnerability that needs to be fixed, a repair function may be made as a patch module and is loaded into the operating system. Such a process may be referred to as "patching". Fixing the operating system usually needs to make a user unaware. In other words, a device does not need to be rebooted in the fixing process. Fixing a kernel is an important part. The kernel is a most basic part of the operating system, and can provide secure access to computer hardware for a plurality of applications. To meet the foregoing requirement, a hotfix mechanism is usually used to fix the kernel.

A main advantage of a hotfix is that an old function is replaced with a new function without rebooting a computer device, to fix a defect or a vulnerability in a current software version of the computer device. When the old function is called, the old function jumps to the new function, and the new function is executed. The hotfix is used to fix the vulnerability of the operating system without rebooting the operating system. This reduces a system downtime and increases system availability. The hotfix is also applicable to debugging and testing during development. For example, during development of a software module or a kernel, if information needs to be added to a function or a specific value needs to be assigned to a variable in a function, a hotfix may be used for implementation, without performing a series of operations such as recompiling the kernel, installing, and rebooting.

Because the kernel has a corresponding source code package, a hotfix module may be made based on the source code package and a symbol table. The hotfix module may include an address of the old function and an address of the new function. After the hotfix module is registered with the kernel, the kernel may extract information from the hotfix module, and replace an original no operation instruction (nop) in a function header of the old function with a jump instruction. When the old function is called, the old function is not executed. Instead, the new function is jumped to, so as to execute the new function. The following uses the LINUX operating system as an example to describe a principle of the hotfix mechanism in detail. The hotfix mechanism may be divided into two phases an initialization phase in which a hotfix module is parsed and a corresponding new function is registered for an old function, and a function jump phase.

A function may include a function header and a function body. In a function definition, all parts before the function body are referred to as the function header. The function header provides function prototype information such as a return type of the function, a sequence and types of parameters. The function body is a collection of all code that defines a function in a programming language.

Figure 4:
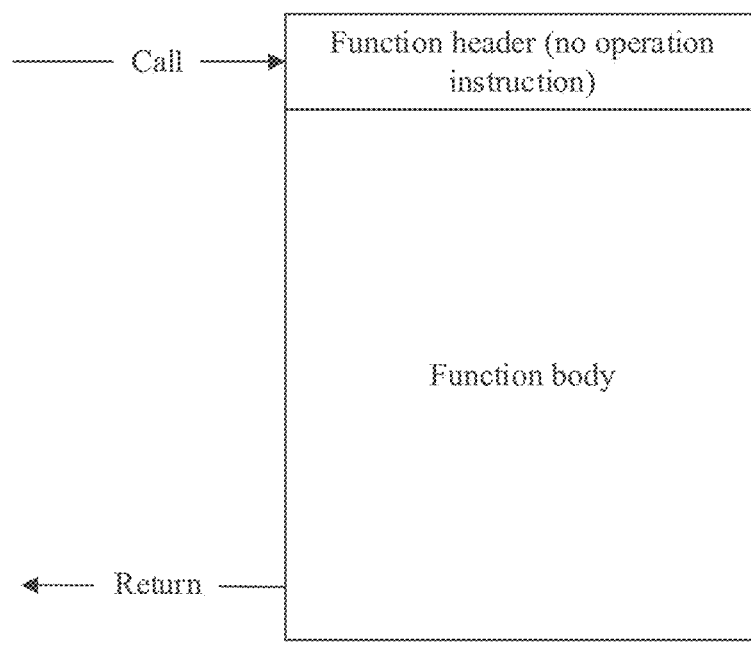
FIG. 4 is a schematic diagram of a function call according to an embodiment of this application.

A procedure in which a function 1 for which no corresponding hotfix function of the function 1 is registered is called is shown in FIG. 4. When the function 1 is called, a procedure recorded in a function header of the function 1 is first executed. Generally, a no operation instruction is recorded in the function header. After the no operation is performed, the code that defines the function in the function body is executed.

Figure 5:
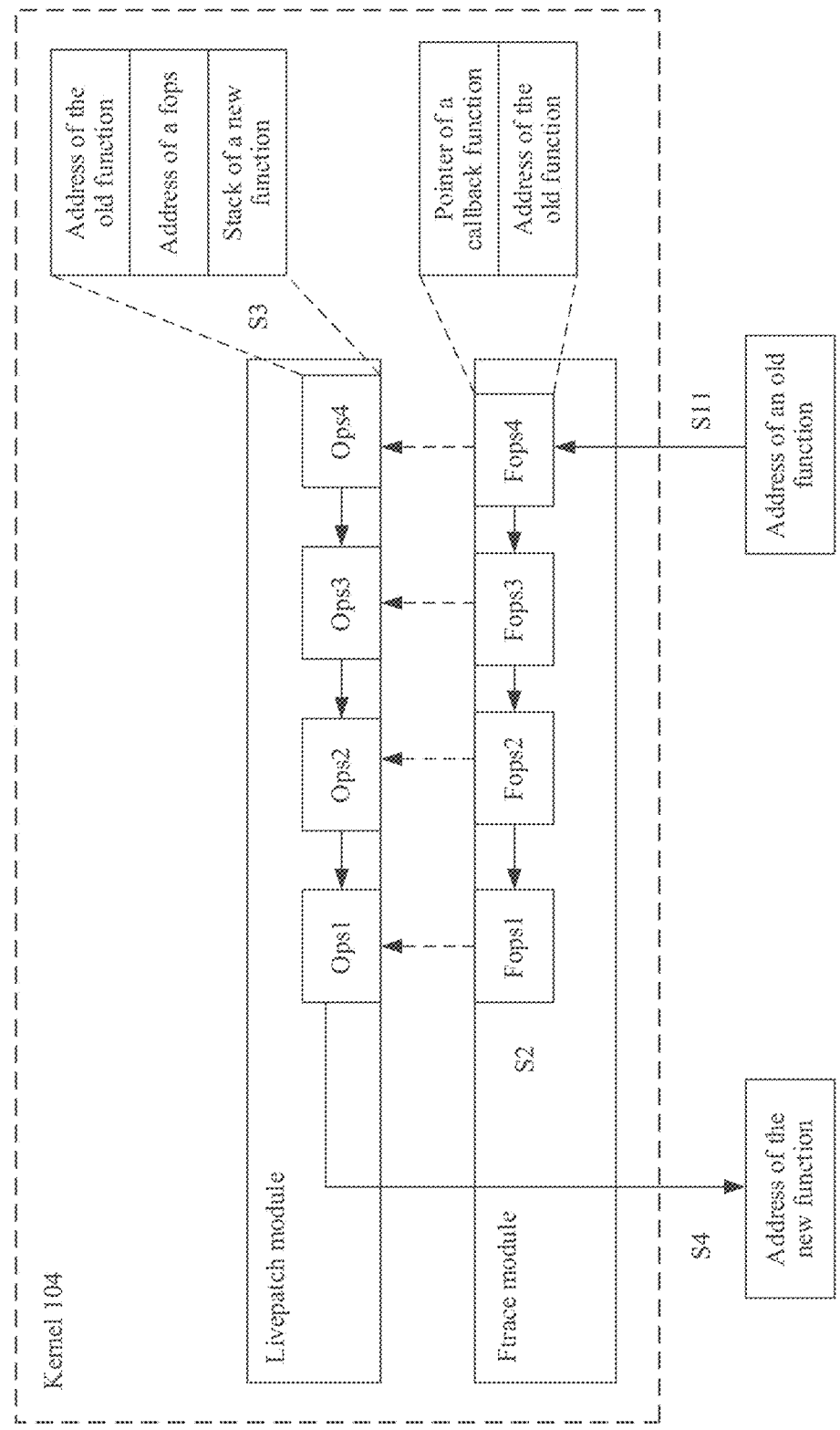
FIG. 5 is a diagram of a principle for implementing a function jump according to an embodiment of this application.

The kernel 104 of the node 100 in FIG. 1 may include an ftrace module and a livepatch module. As shown in FIG. 5, the ftrace module and the livepatch module are configured to implement a function jump. Before describing a method for implementing a function jump, the following related concepts are described first.

Mcount is a mechanism in the operating system. During kernel compilation, several bytes are reserved in a function header of each function to trace the function or test performance of the function. Such a mechanism is referred to as mcount in the LINUX operating system.

An ftrace is one of most effective tools for code-level practice analysis in LINUX. The ftrace is a mechanism that can be used to trace a function call in a LINUX kernel, and can trigger specific code before a prologue of each function call. The ftrace can be used to record information about different function calls performed when the kernel runs, and can help a developer and a system designer obtain running information of a current kernel, so as to analyze a kernel event, a context, a function progressive relationship, a kernel function call relationship, or a function stack. The ftrace can also analyze a kernel-specific event such as function scheduling or an interrupt event, and can also trace kernel functions and call stacks of these functions. The call stack is used to store information about an active subroutine of a computer program. The ftrace can also track a latency, such as a time for which an interrupt is masked, a time for which preemption is disabled, and a time between a moment when a process is woken up and a moment when the process starts to be performed.

Figure 6:
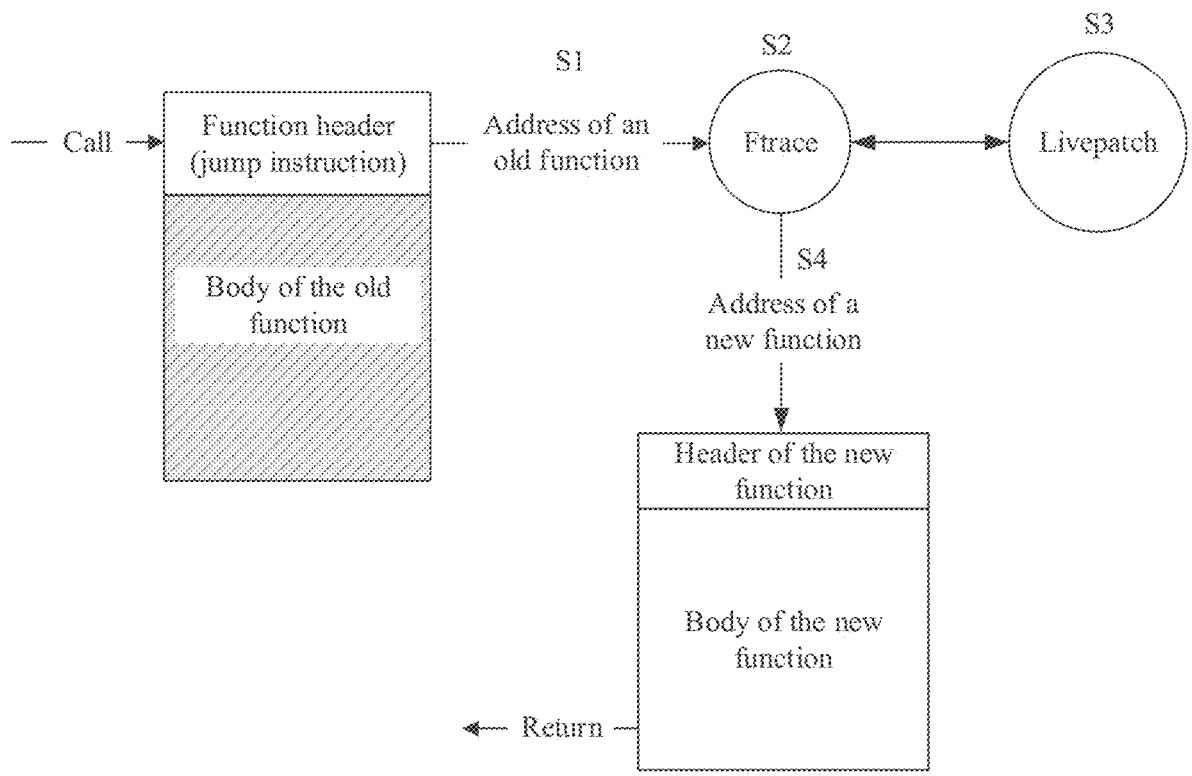
FIG. 6 is a diagram of a principle for implementing a function jump according to an embodiment of this application.

Kpatch is a technology that implements dynamic patching of the LINUX kernel without rebooting a system. Kpatch includes a user-mode tool kpatch tool and a kernel-mode mechanism livepatch. The livepatch is a core component in the function jump phase during hotfix implementation. As shown in FIG. 6, the livepatch implements replacement of a kernel function based on the ftrace, reserves several bytes at each function entry during the kernel compilation by using the mcount mechanism, and replace the bytes reserved at the old function entry with a jump instruction during patching. After an address of a new function is found, an execution procedure of the new function is executed to implement function-level live replacement. The livepatch is an only hotfix mechanism that is highly compatible with the ftrace in the industry, and therefore the livepatch is dominant in LINUX. The livepatch is a service component that is provided by the LINUX operating system and that supports hotfix loading, activation, rollback, and deletion. The livepatch can fix a defect of a current software version based on the hotfix module without rebooting a device. The service component is also responsible for checking whether a function is called by a thread and ensuring consistency.

A struct is a data structure and is an aggregate data type. The struct may be declared as a variable, a pointer, or an array, to implement a comparatively complex data structure. The struct is also a set of elements, where these elements are referred to as members of the struct. These members may be different types and generally perform access by using names.

The old function is relative to the new function. The new function is a function that is registered or configured, to be used to fix or replace the old function, and the new function may also be referred to as a patch function of the old function. The address of the old function indicates a start address of the old function in storage space, and the address of the new function indicates a start address of the new function in the storage space.

As shown in FIG. 5, the ftrace module is configured to search a single linked list in which a plurality of structs are stored for a struct corresponding to the address of the old function, extract a pointer of a callback function stored in the struct, and jump to the livepatch module. The livepatch module obtains, based on an address of the found struct, a stack of the new function corresponding to the old function, and further obtains the address of the new function corresponding to the old function. The livepatch module implements a jump from the old function to the new function based on the address of the new function.

After the hotfix module is released to a computer system, the computer system registers a new function (patch function) that is used to replace a function 1. Several bytes reserved in a function header of the function 1 in FIG. 6 are replaced with a jump instruction. The computer system does not continue to execute code, shown in FIG. 6, that defines a function in a function body of the function 1. In this case, an implementation procedure of the jump from the function 1 to a function 2 is shown in FIG. 5 and FIG. 6. The function 1 is the old function, and the function 2 is the new function.

Step S1: When the function 1 is called, execute the jump instruction in the function header of the function 1, and then jump to the ftrace module.

The jump instruction in the function header of the function 1 is the pointer of the callback function of the ftrace module. The pointer of the callback function of the ftrace module is used to point to execution logic of the ftrace module.

The callback function is a function called by using a pointer. If a pointer (address) of a function A is used as a parameter to be transferred to a function B, when the pointer is used to call the function A to which the pointer points, the function A is the callback function.

Step S2: The ftrace module traverses the single linked list based on the address of the function 1, searches the single linked list for a struct in which the address of the function 1 is recorded, obtains the pointer of the callback function that is of the livepatch module and that is recorded in the struct, and jumps to the livepatch module.

A linked list is a data structure and is a linear table, and stores a pointer to a next node in each node. This structure enables time complexity of searching the linked list for a node or accessing a specific-numbered node to be O(n). A plurality of structs are recorded in the single linked list. Each node in the single linked list stores a struct and a pointer pointing to a next node. Each of the plurality of structs in the single linked list corresponds to one old function. Each struct includes the address of the old function and the pointer of the callback function. The pointer of the callback function may be the pointer of the callback function of the livepatch module, or may be a pointer of another callback function. In other words, one old function may correspond to a plurality of structs, and pointers of callback functions recorded in the plurality of structs belong to different callback functions. The ftrace module traverses a plurality of structs in the single linked list based on the address of the old function until a struct in which the address of the old function and the pointer of the callback function of the livepatch module are recorded is found, and then jumps to the livepatch module. As shown in FIG. 5, four structs fops 1 to fops 4 are stored in the single linked list, and each struct stores an address of an old function and the address of the callback function are stored in. It is assumed that the address of the old function stored in the struct fops4 is the address of the function 1, and the stored pointer of the callback function is the pointer of the callback function of the livepatch module. The ftrace module finds, after traversing the single linked list based on the address of function 1, that the struct fops4 stores the address of the old function A, obtains the pointer of the callback function of the livepatch module from the struct fops4, and jumps to the livepatch module.

During an initialization phase, when the livepatch module registers the struct of the old function for the old function, the livepatch module sends, to the ftrace module, the address of the old function and an address of storage space allocated to the struct. Therefore, after finding the struct corresponding to the old function, the ftrace module may send the address of the found struct to the livepatch module. In the foregoing example, the ftrace module also sends an address of the struct fops4 to the livepatch module.

Step S3: The livepatch module uses the address of the received struct fops to directly obtain a struct ops in which a function stack corresponding to the old function is stored, where the function stack stores a plurality of hotfix functions for the same old function. Because an old function may be fixed for a plurality of times, an address of the old function may correspond to addresses of a plurality of new functions.

Step S4: The livepatch module extracts the address of the new function from the function stack, and calls the new function, to implement function replacement.

Figure 7:
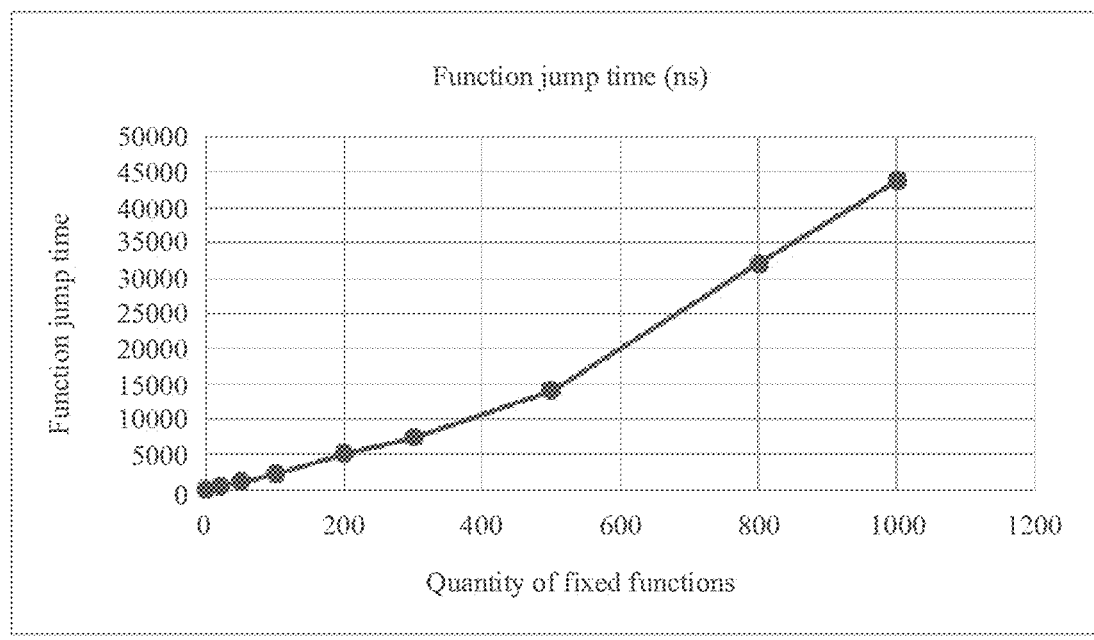
FIG. 7 is a line chart depicting a relationship between a function jump time and a quantity of fixed functions in a other approaches according to an embodiment of this application.

In this solution, a correspondence between an old function and a new function is established by using a struct fops to implement a jump from the old function to the new function. The fops struct is required when the ftrace module searches for the pointer of the callback function of the livepatch module, and the fops struct is also required when the livepatch module searches for the address of the new function. Therefore, "old function→fops→new function" needs to be in a one-to-one correspondence. One struct fops need to be added when one new function is registered. Consequently, the single linked list increases, and traversal time accordingly increases. As a quantity of fixed old functions increases, a quantity of struct fops stored in the single linked list accordingly increases, and a traversal time of the single linked list accordingly increases, that is, a function jump time increases, resulting in high performance overheads. As shown in FIG. 7, a time required for a function jump basically increases linearly with an increase of a quantity of hotfix functions. If a hotspot function (that is, a frequently-called function) in the kernel has a corresponding hotfix function, when the hotspot function is called, a case in which the function jump time is far longer than an execution time of the hotfix function occurs. In this case, execution efficiency of the hotspot function is significantly reduced. In addition, the entire single linked list needs to be traversed when each function jump is performed. This means that all the hotfix functions are affected with each other, resulting deterioration of overall performance.

To resolve a problem that the function jump time is excessively long, a common practice in the industry is to modify a function header of an old function, to enable the function header to directly point to a header of a new function. The foregoing query process is avoided in such an "old function-new function" manner, so that the function jump time is reduced. However, this solution conflicts with the ftrace, resulting that the ftrace is unavailable.

This application provides a method for implementing a function jump, to perform decoupling between the livepatch module and the ftrace module to some extent. This method may be applied to LINUX platforms in current mainstream, such as CENTOS, RED HAT, and UBUNTU. In the technical solution provided in this application, addresses of a plurality of old functions are stored in one struct, and whether an address of a called function is stored in the struct is searched for. If it is determined that the address of the called function is stored in the struct, a function stack corresponding to the called function is searched for based on the address of the called function, to obtain an address of a new function stored in the function stack.

Figure 8:
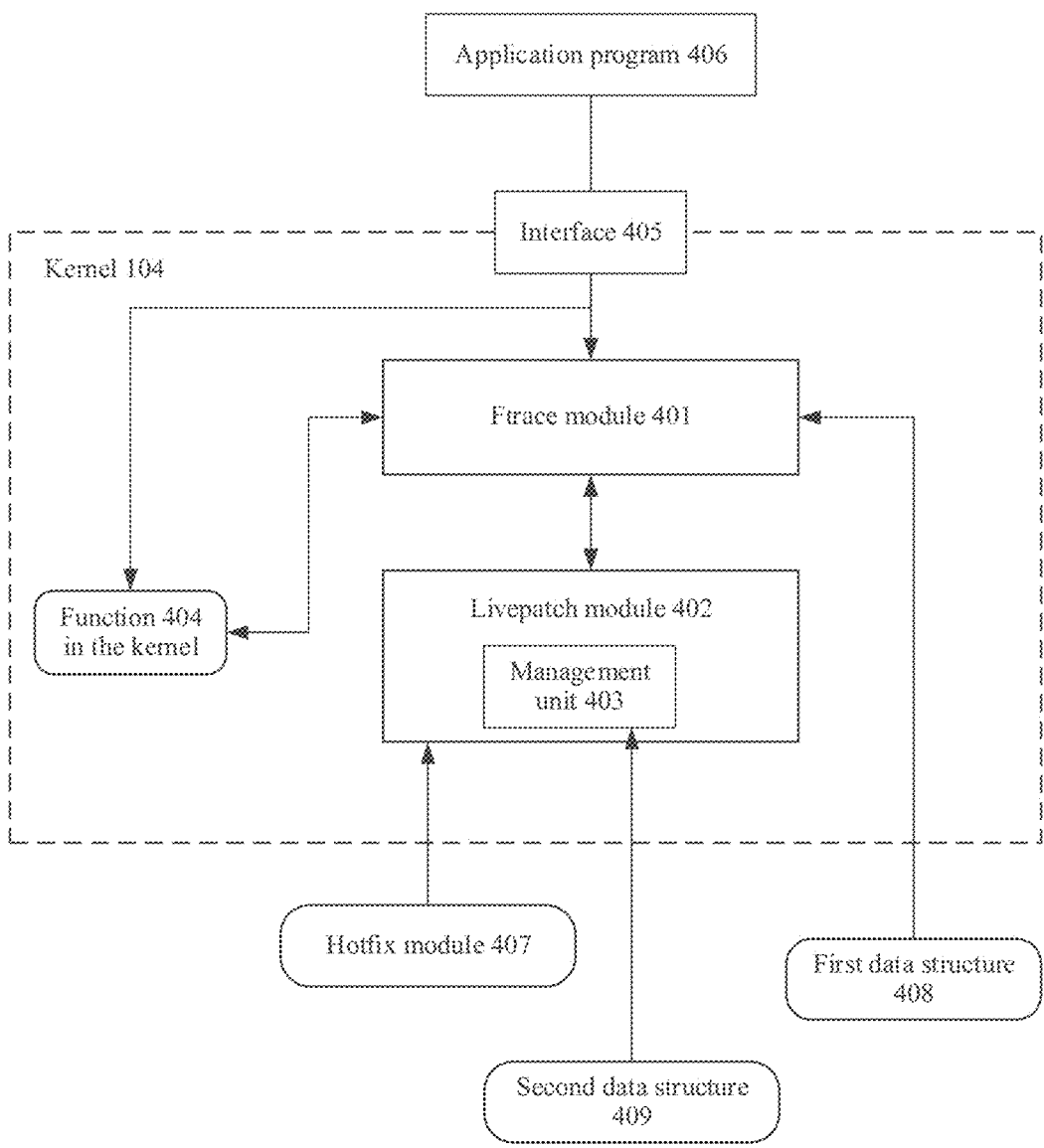
FIG. 8 is a diagram of a principle for implementing a function jump in a kernel according to an embodiment of this application.

As shown in FIG. 8, the kernel 104 in FIG. 1 may include an ftrace module 401, a livepatch module 402, and a function 404 in the kernel. One or more application programs 406 may call the function 404 in the kernel through an interface 405. The application program 203 may further configure the ftrace module 401 through the interface 405.

The ftrace module 401 is configured to trace a call status of the function 404 in the kernel. In this embodiment of this application, a first data structure 408 stores the addresses of the plurality of old functions that have corresponding hotfix functions. Compared with the other approaches in which a quantity of structs is the same as a quantity of old functions, the quantity of structs is fixed to 1 in this application. A single item is used to replace a single linked list that includes a plurality of structs in the other approaches. When the function 404 in the kernel is called, the ftrace module 401 is configured to search the first data structure 408 for an address of the function based on the address of the function, when the address of the function is found in the first data structure 408, extract a pointer that is of a callback function of the livepatch module 402 and that is stored in the first data structure 408, and jump to the livepatch module 402.

The livepatch module 402 is configured to search for the address of a new function corresponding to the old function. When receiving a hotfix module 407, the livepatch module 402 is further configured to register the old function and a function stack corresponding to the old function, and register the address of the old function with the first data structure 408 in the ftrace module. In this embodiment of this application, the livepatch module 402 includes a management unit 403. The management unit 403 is configured to manage the addresses of all the old functions and the function stack corresponding to the old function. The management unit 403 may perform operations such as adding, deleting, and querying an address. Further, the management unit 403 may manage a correspondence between an address of an old function and a function stack by using a data structure (for example, a hash table or a hash tree) that can be used to efficiently implement querying. In this way, decoupling between the livepatch module and the ftrace module is performed to some extent, so that the livepatch module does not depend on the struct in the single linked list when querying the address of the new function.

Figure 9:
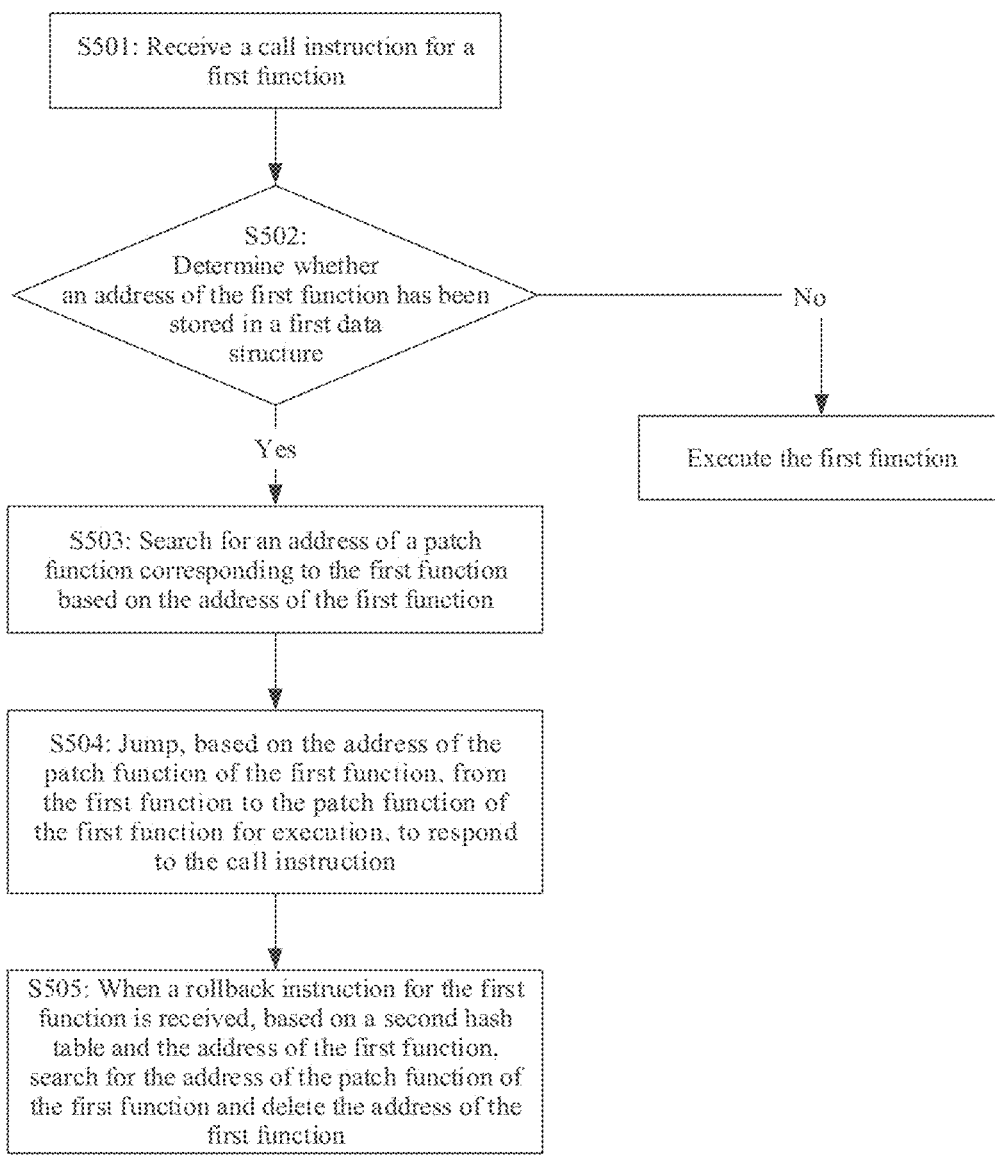
FIG. 9 is a flowchart of implementing a function jump according to an embodiment of this application.

An embodiment of this application provides a method for implementing a function jump. As shown in FIG. 9, the method includes the following steps.

Step S501: Receive a call instruction for a first function.

The call instruction may include an address of the first function, where the address of the first function is a start address of the first function in address space.

Optionally, if several bytes at an entry of a function header of the first function have been replaced with a pointer of a first callback function. The pointer points to the first callback function. When the first function is called, the first callback function is called by using the pointer that is of the first callback function and that is recorded in the function header of the first function. That is, step S502 is performed.

Optionally, if a no operation instruction is stored in the function header of the first function, a function-related feature defined in a function body of the first function continues to be performed.

Optionally, before step S501, the method further includes replacing the several bytes in the function header of the first function with the pointer of the first callback function.

Step S502: Determine whether the address of the first function has been stored in a first data structure.

Addresses of a plurality of functions are stored in the first data structure. The addresses of the plurality of functions stored in the first data structure are traversed based on the address of the first function, to determine whether the addresses of the plurality of functions include the address of the first function. An address of a function indicates a start address of the function in storage space. A pointer of a second callback function and the addresses of the plurality of functions are stored in the first data structure. These functions are functions in a kernel that need to be fixed or need to be replaced, and patch functions of these functions have been registered to replace these functions. The second callback function is used to search for an address of a patch function of the first function based on the address of the first function. Because the pointer of the second callback function required for a function jump is unchanged, in this embodiment of this application, the addresses of the plurality of functions may be stored in one data structure.

When the first function is called, the address of the first function is system-known. A purpose of determining whether the address of the first function is stored in the first data structure is to determine whether the patch function used to replace the first function is registered. In other words, the purpose is to determine whether the first function has a corresponding hotfix function. Function replacement may be understood as function fixing. In a hotfix implementation mechanism, a replacement process may be understood as a jump from a function to a patch function of the function.

Optionally, before step S502, the method further includes adding the address of the first function to the first data structure when the patch function of the first function is registered. In the other approaches, when a patch function of a function is registered, a data structure (struct) is newly added, and an address of the function is stored in the newly added structure. In this solution, the address of the function is added to a same data structure. This shortens a length of a single linked list.

Optionally, the first data structure is a first hash table.

Optionally, the method further includes determining the first hash table by using a struct in which an address of the first hash table is stored, where a pointer pointing to the struct in which the address of the first hash table is stored is included in a first struct.

Figure 10:
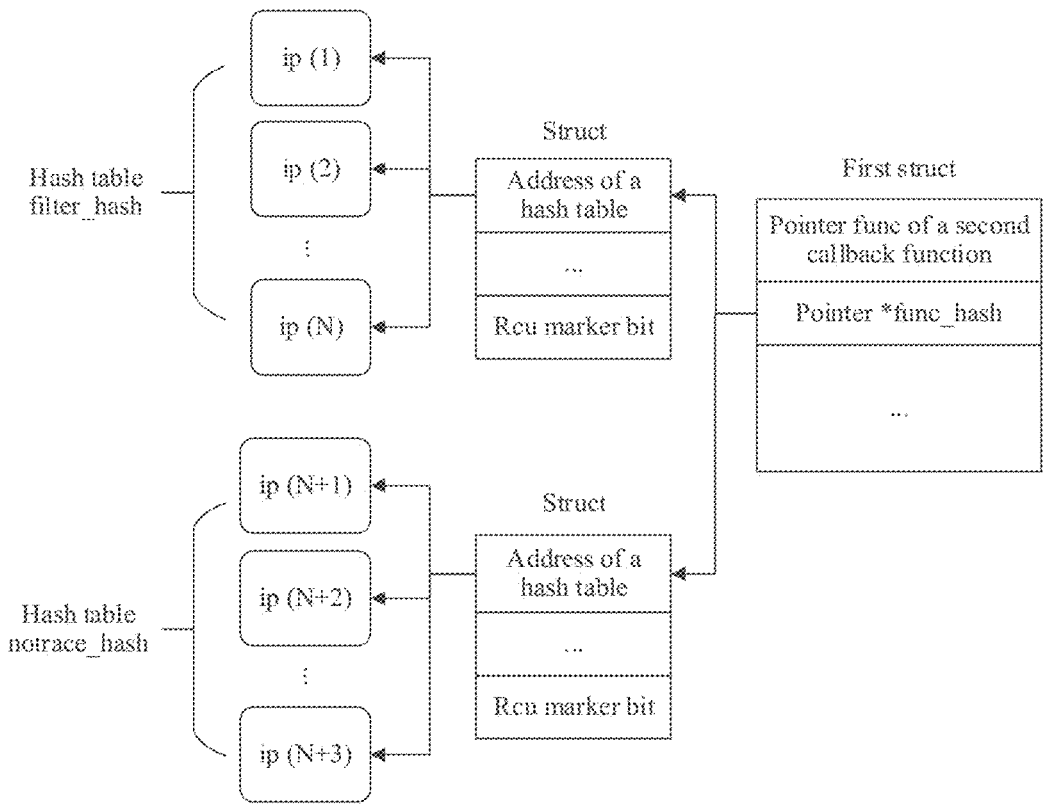
FIG. 10 is a schematic diagram of a data structure of a first struct according to an embodiment of this application.

In an implementation, a data structure of the first struct is shown in FIG. 10. Main data parameters are as follows.

Func is a pointer of the second callback function. If the pointer of the second callback function is stored in the first struct, the second callback function is used to search for a patch function corresponding to a called function based on an address of the called function.

*Func_hash is a pointer of at least one struct, and one pointer points to one struct.

Main parameters of the struct to which the pointer is pointed are as follows.

An address of a hash table (*buckets) is used to record an address of the hash table in storage space. The hash table is used to store addresses of a plurality of functions. The plurality of functions described herein are old functions for which corresponding patch functions are registered. When these functions are called, corresponding patch functions need to be jumped to for execution As shown in FIG. 10, addresses from an ip (1) to an ip (N) of N functions are stored, where the ip (1) to the ip (N) respectively indicate an address of a function 1 to an address of a function N.

An read-copy-update (rcu) marker bit: rcu is a group of LINUX kernel application programming interfaces (APIs), and implements a synchronization mechanism that allows a plurality of readers and writers to concurrently perform operations without any lock. This synchronization mechanism can be used to protect data that is accessed by using a pointer. The rcu mark bit is used to mark whether a read operation is performed on the first hash table Optionally, the first hash table is determined by using the struct in which the address of the first hash table is stored. The pointer that points to the struct in which the address of the first hash table is stored is included in the first struct. Whether the address of the first function is stored in the first hash table is confirmed based on the address of the first function. The address of the first hash table is stored in the first struct, and the addresses of the plurality of functions are stored in the first hash table. The hash table is a structure in which data is stored by using a key-value (key-indexed) structure. A value corresponding to a to-be-searched value can be found when the to-be-searched value, that is, a key is input. Whether the address of the first function is stored in the first hash table can be quickly confirmed based on a hash value of the address of the first function.

Optionally, when the addresses of the plurality of functions include an address that is the same as the address of the first function, it is determined that the addresses of the plurality of functions stored in the first data structure include the address of the first function. In other words, there is a patch function that is used to replace the first function. The first function is an old function for which a corresponding new function has been registered. The second callback function is called based on the pointer that is of the second callback function and that is stored in the first struct. That is, step S503 is performed. The second callback function is used to search for the new function corresponding to the called function.

Optionally, when the addresses of the plurality of functions stored in the first data structure includes no address of the first function, there is no patch function that is used to replace the first function, and a function-related feature defined by the function body of the first function may continue to be performed.

Optionally, as shown in FIG. 10, *func_hash in the first struct includes two pointers, and each pointer points to a struct in which an address of a hash table is stored. A hash table filter_hash is used to record an address of a function that is traced by an ftrace, and a hash table notrace_hash is used to record an address of a function that is not traced by the ftrace. If the address of the first function is stored in the hash table notrace_hash, it indicates that the first function is not traced by the ftrace, and the function-related feature defined by the function body of the first function continues to be performed.

Optionally, before step S502, the method further includes, when the patch function of the first function is registered, adding the address of the first function to the first data structure. Further, the address of the first function may be added to the first hash table in the first struct, and the first hash table is used to store the addresses of the plurality of functions that need to be fixed by using the patch function.

Step S503: Search for the address of the patch function corresponding to the first function based on the address of the first function.

A second data structure is searched for the address of the patch function of the first function based on the address of the first function. The patch function of the first function is registered to replace the first function, correspondences between addresses of a plurality of functions and patch functions of the plurality of functions are stored in the second data structure, and an address of each of the plurality of functions corresponds to a patch function of the function.

Figure 11A:
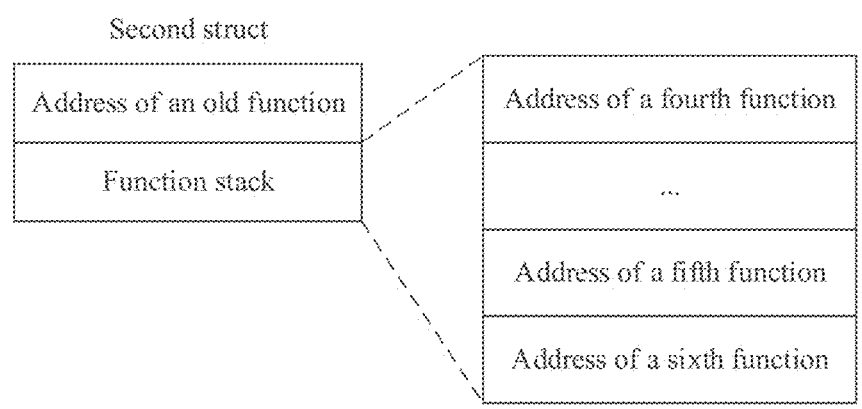
FIG. 11A is a schematic diagram of a data structure of a second struct according to an embodiment of this application.
Figures 11B, 12:
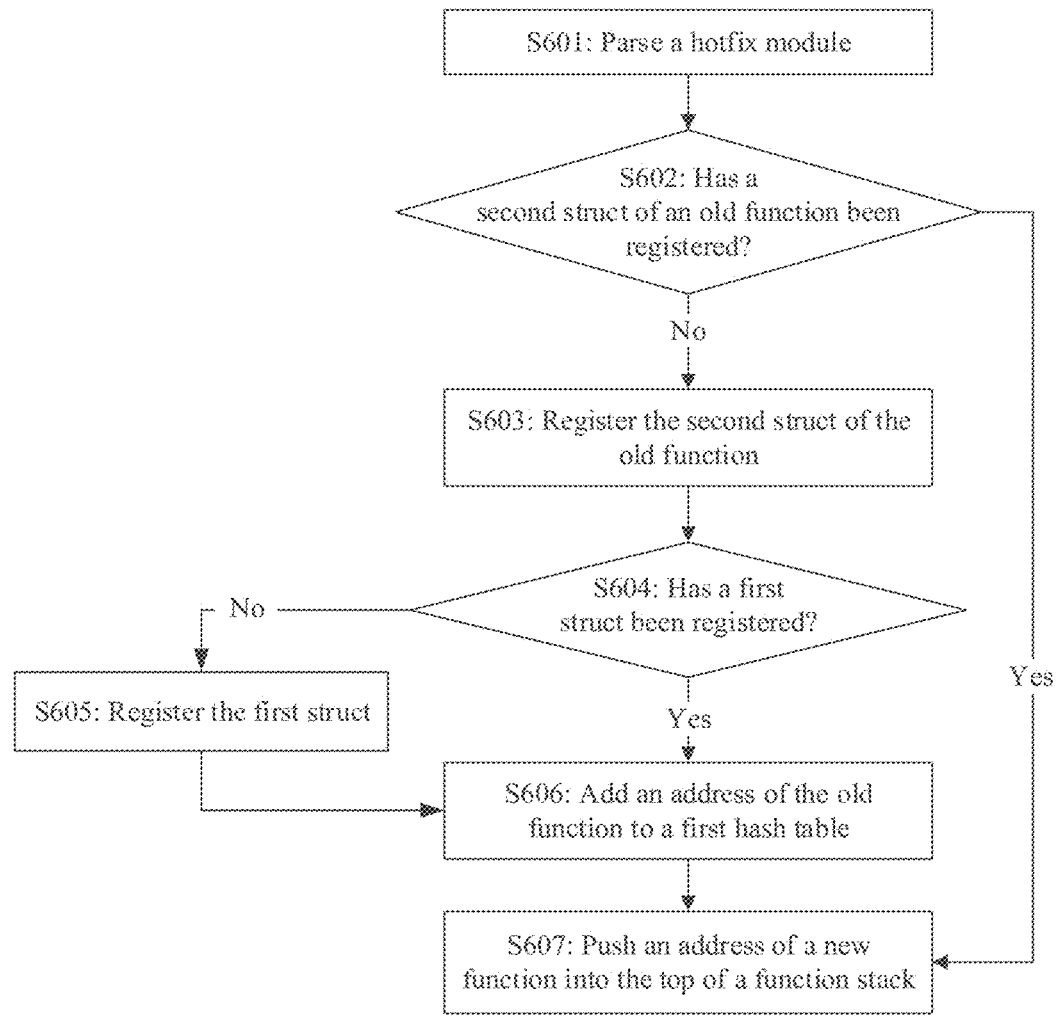
FIG. 11B is a schematic diagram of a second hash table according to an embodiment of this application.
FIG. 12 is a flowchart of implementing a function jump according to an embodiment of this application.

Optionally, each of the plurality of functions corresponds to a second struct, and an address of the patch function of the function is stored in the second struct of each function. Because an old function may be fixed for a plurality of times, addresses of new functions that fix the same old function may be all stored in a function stack. As shown in FIG. 11A, an address of each old function and the function stack of the function are stored in the second struct. Addresses of one or more patch functions are stored in the function stack of the old function. An address of a fourth function, an address of a fifth function, and an address of a sixth function all are addresses of patch functions that are used to fix the old function, and the address of the fourth function is located at the top of the function stack. A function stack of the first function is found based on the address of the first function, and an address that is at the top of the function stack and that corresponds to the first function is extracted. The address is the address of the patch function corresponding to the first function. A second hash table is used to store correspondences between addresses of a plurality of functions and second structs of the plurality of functions. As shown in FIG. 11B, a correspondence between a hash value of an address of each of a first function to an $N^{th}$ function and a second struct of the function may be stored in the second hash table. A second struct corresponding to the address of the first function is searched for in the second hash table based on the address of the first function, and the address of the patch function of the first function is obtained from the found second struct.

Optionally, the method further includes, when an instruction for modifying the second hash table is received, modifying a third hash table after a read operation performed on the second hash table is completed.

Step S504: Jump, based on the address of the patch function of the first function, from the first function to the patch function of the first function for execution, to respond to the call instruction.

The address stored in a register of the first function is replaced with the address of the patch function of the first function. To respond to the call instruction, a function call needs to be performed based on the address stored in the register. Because the address stored in the register of the first function is replaced with the address of the patch function of the first function, the patch function of the first function is called to respond to the call instruction.

To search for the address of the patch function of the called first function, in the other approaches, the single linked list in which a plurality of structs are stored needs to be traversed to search for the struct in which the address of the first function is stored, and an address of the struct is obtained. Then, the function stack of the first function is found based on the address of the struct, and further the address of the patch function is obtained. According to the method provided in this embodiment of this application, the address of the first function is searched for in one data structure. Then, the function stack of the first function is found based on the address of the first function, and further the address of the patch function is obtained. According to the method provided in this embodiment of this application, time complexity is reduced from O(N) to O(1), so that a function jump time can be reduced. In addition, a hash table is used to store a correspondence between an address of an old function and a struct of the old function, so that a time consumed in the step of searching for the address of the new function can be reduced.

In another embodiment, when a rollback instruction is received, the method further includes the following steps.

Step S505: In response to the rollback instruction for the first function, based on the second hash table and the address of the first function, search for the address of the patch function of the first function and delete the address of the patch function of the first function, where the rollback instruction is used to undo replacement of the first function with the patch function of the first function.

The second struct of the first function is searched for in the second hash table based on the address of the first function, and the address that is at the top of the function stack and that is stored in the second struct is deleted.

A rollback means to restore a fixed function to a function before the function is fixed. Rolling back the first function means to restore the first function to a function before the first function is fixed. The function stack of the first function is searched for based on the address of the first function, and the address at the top of the function stack is deleted from the function stack. A plurality of second structs are managed by using the hash table, so that a time consumed in rolling back a hotfix function can be reduced.

Optionally, after the address at the top of the function stack of the first function is deleted, if the function stack is an empty stack in which there is no remaining address of functions, the function stack is deleted, and the second struct corresponding to the first function is deleted.

Optionally, after the address at the top of the function stack of the first function is deleted, if there is a remaining address of a function in the function stack, an address that is currently located at the top of the function stack is replaced with the address stored in the register of the first function.

An embodiment of this application provides a method for implementing a function jump. The method is performed in a phase of registration of a hotfix module (for example, the hotfix module 407 shown in FIG. 8). As shown in FIG. 12, the method includes the following steps.

Step S601: Receive and parse the hotfix module.

When a function of a kernel needs to be fixed, the hotfix module is sent to a computer system, and the computer system receives and parses information about the hotfix module. The hotfix module may include addresses of one or more old functions and an address of a new function corresponding to each old function. The old function is a function that needs to be fixed, and the new function is a function that is used to fix the old function. An address of a function indicates a location of the function in address space.

Step S602: Determine whether a second struct of the old function has been registered.

Whether the second struct has been registered for any one of the one or more old functions in the hotfix module. The second struct is used to store the address of the old function and a patch function of the old function, and a data structure of the second struct is shown in FIG. 11A. A function may be fixed for a plurality of times, and addresses of one or more functions that are stored in a function stack of the function and that are used to fix the function are stored in the second struct.

Optionally, if a corresponding fourth struct has been registered for the old function, it indicates that the old function has been fixed before current function fixing. A function used to fix the old function last time is stored in the function stack. Then, step S607 is subsequently performed.

Optionally, if no corresponding function stack is registered for the old function, step S603 is performed.

Step S603: Register the second struct of the old function.

The old function is registered (or the second struct with the system. The data structure of the second struct is shown in FIG. 11A, and includes the address of the old function and the function stack used to store addresses of one or more patch functions of the old function.

Optionally, a second hash table may manage a plurality of second structs. In other words, correspondences between addresses of a plurality of old functions and second structs of the plurality of old functions are stored in the second hash table.

Step S604: Determine whether a first struct has been registered.

The first struct may be used to store a pointer of a second callback function and the addresses of the plurality of old functions. The second callback function is used to search for, based on an address of a called function, an address of a new function that is used to fix the called function. A data structure of the first struct is shown in FIG. 10. For the data structure of the first struct, refer to the corresponding description in step S502. Details are not described herein again.

Optionally, when the first struct is not registered, step S605 is performed.

Optionally, when the first struct is registered, step S606 is performed.

Step S605: Register the first struct.

Some address space is used to store data in the first struct. The pointer of the second callback function and addresses of the plurality of old functions are stored in the first struct. A function header of the old function is found based on the address of the old function, and several bytes at an entry of the function header are replaced with a pointer of a first callback function. The first callback function is used to search the first struct for the address of the called function and obtain the pointer of the second callback function.

Optionally, a first hash table in the first struct is used to store the addresses of the plurality of old functions.

Step S606: Add the address of the old function to the first hash table

Step S607: Push the address of the new function into the top of the function stack.

The address of the new function is stored at a start part of address space of the function stack.

In the phase of registration of the hotfix module, in the other approaches, one struct is registered for each old function, to store the address of the old function and the pointer that is of the callback function and that is used to search for the address of the new function, and structs of the plurality of the old functions are stored in a single linked list. In this embodiment of this application, the address of the old function is added to the first hash table. Compared with the other approaches, a length of the single linked list is greatly shortened, so that time complexity of the step of querying the address of the old function is reduced from O(N) to O(1). This reduces a query time. Further, a correspondence between an address of an old function and a function stack is stored by using the hash table, so that a time for querying the address of the new function can be reduced.

Figure 13:
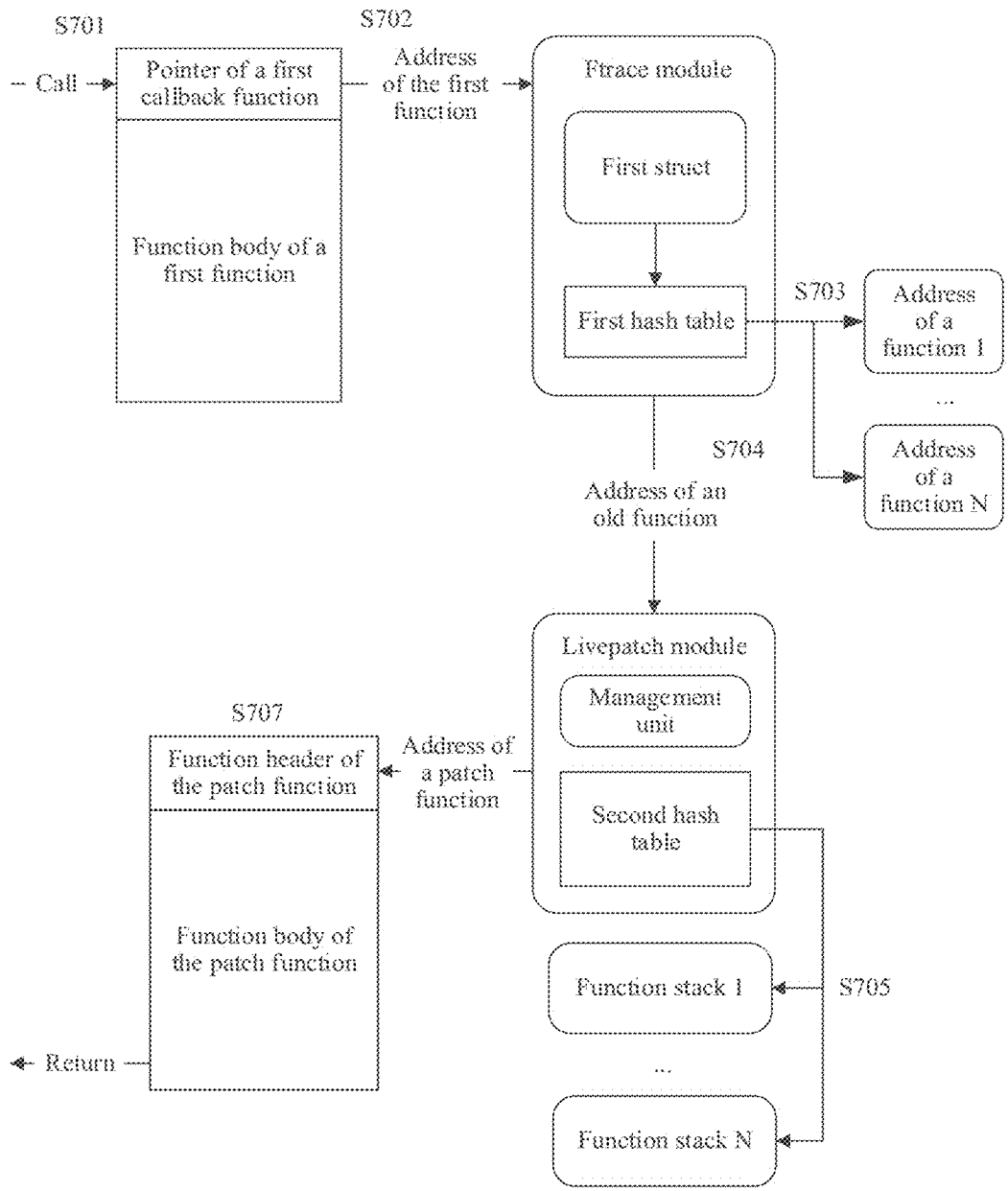
FIG. 13 is a flowchart of implementing a function jump according to an embodiment of this application.

An embodiment of this application provides a method for implementing a function jump. As shown in FIG. 13, the method may include the following steps.

Step S701: Receive a call instruction for a first function, where the call instruction may include an address of the first function.

Step S702: Jump to an ftrace module based on a pointer that is of a callback function of the ftrace module and that is in a function header of the first function, and send the address that is of the first function and that is used as an input parameter to the ftrace module.

In the phase of registration of the hotfix module, several bytes at an entry of a function header of the first function have been replaced with the pointer of the callback function of the ftrace module. The pointer points to execution logic of the ftrace module, that is, step S703.

Step S703: The ftrace module determines whether the address of the first function is stored in a first hash table.

The ftrace module finds a struct in which an address of the first hash table is stored based on a pointer in the first struct. The ftrace module traverses, based on the address of the first function, addresses of a plurality of functions that have been stored in the first hash table.

Optionally, if the ftrace module finds the address of the first function in the first hash table based on the address of the first function, that is, if the address of the first function has been stored in the first hash table, step S704 is performed. Addresses of a plurality of functions that need to be fixed, such as an address of a function 1 to an address of a function N, where N is a positive integer greater than 1, are stored in the first hash table. For a data structure of the first struct, refer to the corresponding description in step S502. Details are not described herein again. The ftrace module may calculate a hash value of the address of the first function, and traverse the first hash table to confirm whether the hash value of the address of the first function has been stored in the first hash table.

Optionally, if the ftrace module finds no address of the first function in the first hash table, the ftrace module calls the address that is of the first function and that is recorded in a register of the first function, to execute the first function.

Step S704: The ftrace module jumps to a livepatch module based on a pointer that is of a callback function of the livepatch module and that is stored in the first struct, and sends the address of the first function to the livepatch module, where the pointer of the callback function of the livepatch module points to execution logic of the livepatch module.

Step S705: A management unit in the livepatch module searches for an address of a patch function of the first function based on the address of the first function.

The management unit searches a second hash table for the address of the patch function of the first function based on the address of the first function. The management unit searches a plurality of second structs for a second struct of the first function based on the address of the first function, and obtains the address of the patch function of the first function from the top of a function stack stored in the second struct of the first function. A correspondence between an address of each of a plurality of functions and a second struct of the function is stored in a second hash table. For example, correspondences between addresses of a function 1 to a function N and second structs of the function 1 to the function N are stored in the second hash table. The management unit finds, from the second hash table based on the address of the first function, that the second struct of the first function is the second struct of the function N. The management unit obtains an address at the top of a function stack N in the second struct of the function N, that is, the address of the patch function of the first function.

Step S706 (not shown in FIG. 13): The livepatch module replaces the address that is of the first function and that is stored in the register of the first function with the address of the patch function of the first function.

The register originally stores the address of the first function or stores an address of a function that is used to fix the first function last time. The livepatch module replaces the address of the function stored in the register of the first function with the address of the patch function.

Step S707: In response to the call instruction, execute the patch function.

In this embodiment provided in this application, functions of the ftrace module and the livepatch module are specified. The ftrace module is configured to search for the pointer that is of the callback function of the livepatch module and that corresponds to the old function. The ftrace module queries the address of a currently-called old function in the struct in which the addresses of the plurality of old functions are stored, determines that the address of the currently-called old function is stored in the struct, and obtains the pointer of the callback function of the livepatch module, where query complexity is O(1). The livepatch module is configured to search for the address of the new function and replace a value in the register, to implement a function jump. Further, the livepatch module implements quick querying by using a data structure (for example, a hash table or a red-black tree) that is more efficient in querying. The hash table is used as an example, and time complexity for querying is O(1).

Figure 14A:
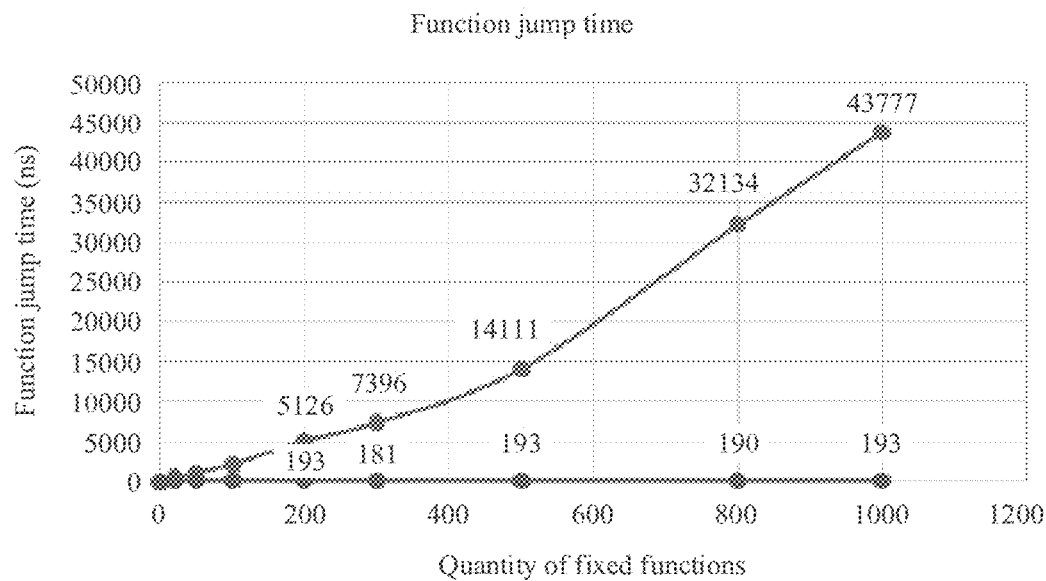
FIG. 14A is a line chart of a comparison between some other approaches method and a method for implementing a function jump according to an embodiment of this application, where the line chart depicts a relationship between a function jump time and a quantity of fixed functions.
Figure 14B:
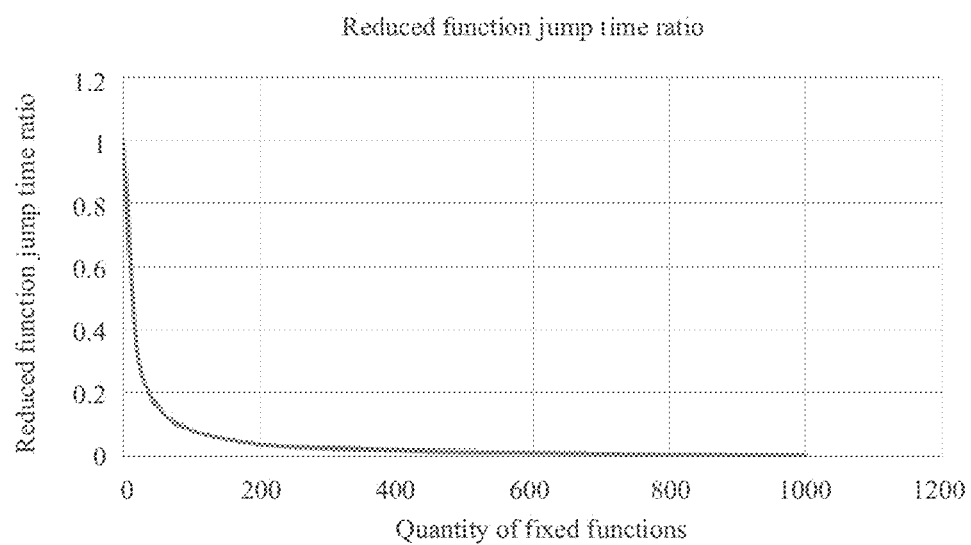
FIG. 14B is a schematic diagram for which a function jump time ratio is reduced by using a method for implementing a function jump according to an embodiment of this application.

A main factor that affects performance of a hotfix function is a function jump time from an entry of the old function to the new function. According to the method for implementing a function jump provided in this embodiment of this application, in a scenario of 1000 hotfix functions, the function jump time is reduced to 0.5% of an original function jump time, and the function jump time no longer linearly increases with an increase of a quantity of hotfix functions, as shown in FIG. 14A and FIG. 14B.

In another embodiment, after step S707, the method further includes that when the livepatch module receives a rollback instruction for the first function, the livepatch module searches the plurality of second structs for the second struct of the first function based on the address of the first function, and deletes the address at the top of the function stack. After the livepatch module deletes the address at the top of the function stack, if there is a remaining address of the functions in the function stack, the livepatch module replaces the address that is at the top of the function stack and that is of the remaining addresses with the address stored in the register of the first function.

Figure 15A:
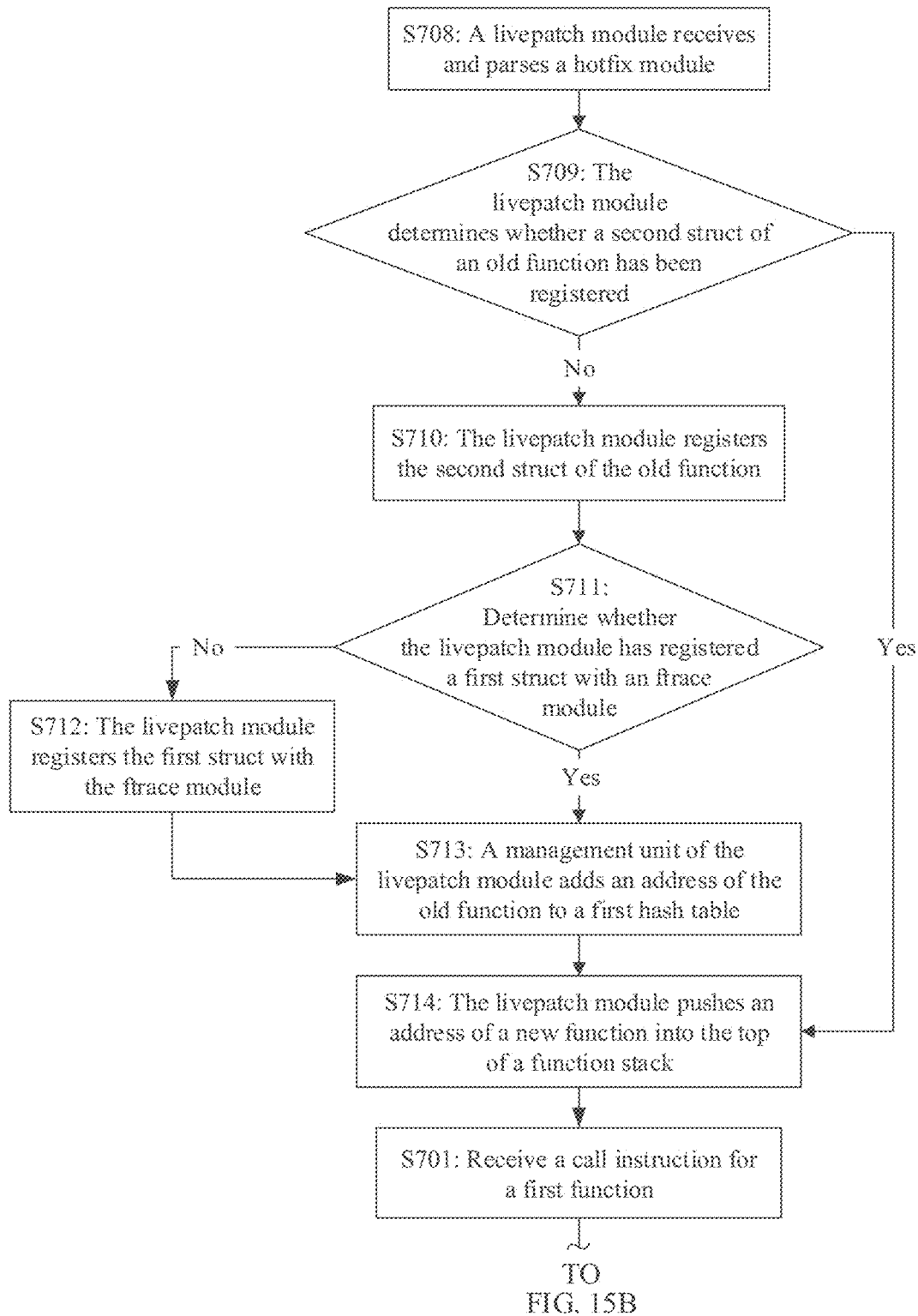
FIG. 15A and FIG. 15B are a flowchart of implementing a function jump according to an embodiment of this application.
Figure 15B:
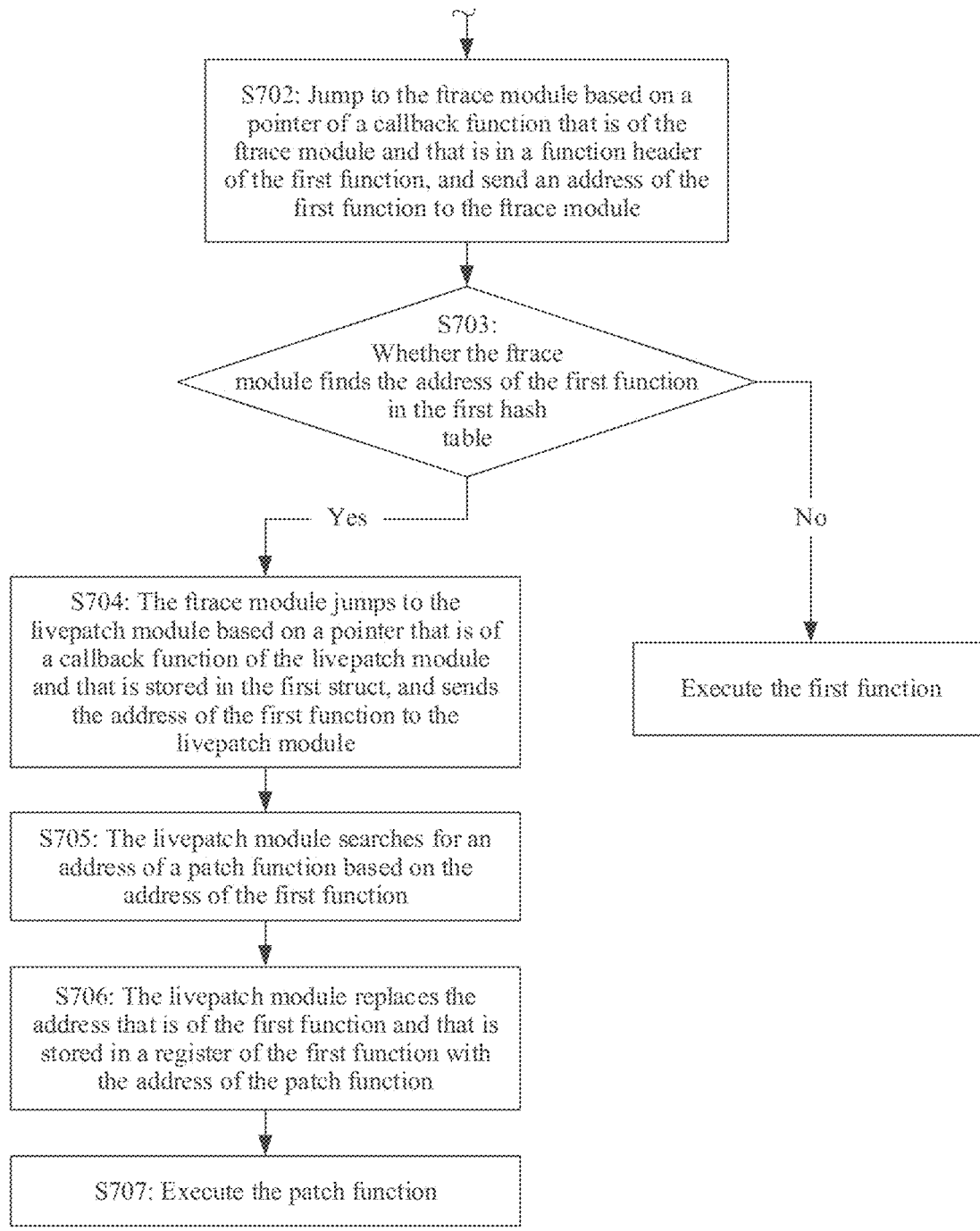

In another embodiment, as shown in FIG. 15A and FIG. 15B, before step S701, the method may further include the following steps.

Step S708: The livepatch module receives and parses the hotfix module.

When a function of a kernel needs to be fixed, the livepatch module receives and parses information about the hotfix module. The hotfix module may include addresses of one or more old functions and an address of a new function corresponding to each old function. The old function is a function that needs to be fixed, and the new function is a function that is used to fix the old function. An address of a function indicates a location of the function in address space.

Step S709: The livepatch module determines whether the second struct of the old function has been registered.

The livepatch module determines whether the second struct has been registered for any one of the one or more old functions in the hotfix module. he second struct is used to store the address of the old function and the function stack of the old function, and a data structure of the second struct is shown in FIG. 11A. A function may be fixed for a plurality of times, and addresses of one or more functions used to fix the function are stored in a function stack of the function.

Optionally, if a corresponding second struct has been registered for the old function, it indicates that the old function has been fixed before current function fixing. A function used to fix the old function last time is stored in the function stack. Then, step S714 is subsequently performed.

Optionally, if no corresponding function stack is registered for the old function, step S710 is performed.

Step S710: The livepatch module registers the second struct of the old function.

The newly added management unit in the livepatch module registers the second struct for the old function. The data structure of the second struct is shown in FIG. 11A, and includes the address of the old function and the function stack used to store the address of the new function corresponding to the old function. The newly added management unit in the livepatch module applies for storing address space of the second struct, and storing the address of the old function and the address of the new function corresponding to the old function into the second struct.

Optionally, the management unit adds, to the second hash table, the second struct and the address of the function to which the second struct belongs. In other words, the management unit adds the address of the old function and the second struct of the old function to the second hash table.

Optionally, the livepatch module calls an rcu interface, and when an rcu module in the kernel determines that the second hash table is being read, the second hash table is locked, so that the second hash table is not modified when being read. For example, when adding a function to or deletes a function from the second hash table, the livepatch module calls the rcu interface in the kernel, and uses the rcu module to manage a linked list. The rcu module determines whether a read operation is performed on the second hash table. If the read operation is performed on the second hash table, a modification operation is not performed on the second hash table until the read operation is completed.

Step S711: Determine whether the livepatch module has registered the first struct with the ftrace module.

The first struct is used to store a pointer of a second callback function and the addresses of the plurality of old functions. The second callback function is used to search for, based on the address of the called function, the address of the new function that is used to fix the called function A data structure of the first struct is shown in FIG. 10. For the data structure of the first struct, refer to the corresponding description in step S502. Details are not described herein again.

Optionally, when the first struct is not registered, step S712 is performed.

Optionally, when the first struct has been registered, step S713 is performed.

Step S712: The livepatch module registers the first struct with the ftrace module.

The livepatch module applies for some address space to store data in the first struct, sends the address of the first struct to the ftrace module, calls an interface of the ftrace module, and registers the first struct with the ftrace module, so that the ftrace module can read the data stored in the first struct based on the received address of the first struct. The first struct is used to store a pointer of a callback function and an address of a function. The livepatch module records the pointer of the callback function of the livepatch module and the address of the old function in the first struct based on a definition of the data structure of the first struct provided by the ftrace module. The callback function of the livepatch module is used to instruct the livepatch module to search for the address of the new function based on the address of the old function. When the first struct is registered with the ftrace module, the livepatch module sends the address of the old function to the ftrace module. The ftrace module finds a function header of the old function based on the address of the old function, and replaces several bytes at an entry of the function header with the pointer of the callback function of the ftrace module. The callback function of the ftrace module is used to search the first struct for the address of the called function and obtain the pointer of the second callback function.

Optionally, a first hash table in the first struct is used to store the addresses of the plurality of old functions.

Step S713: The ftrace module adds the address of the old function to the first hash table.

The livepatch module sends the address of the old function to the ftrace module. The ftrace module obtains the address of the first hash table from a struct to which the pointer in the first struct points, and adds the address of the old function to the first hash table.

Step S714: The livepatch module pushes the address of the new function into the top of the function stack.

The livepatch module stores the address of the new function at a start part of address space of the function stack.

The livepatch module and the ftrace module in the foregoing embodiment may be the livepatch module and the ftrace module described in FIG. 8.

Figure 16:
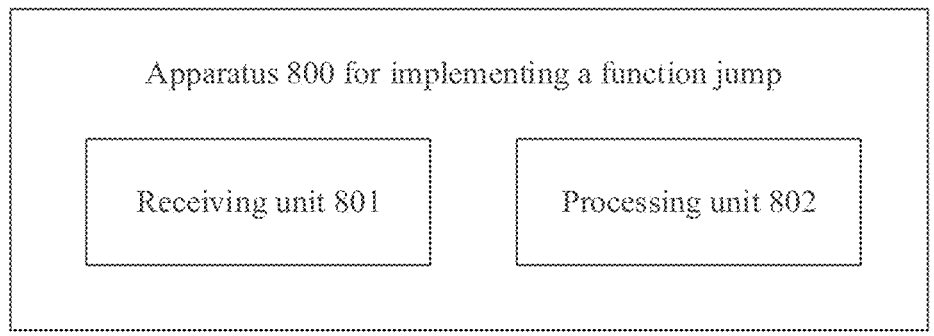
FIG. 16 is a structural diagram of an apparatus for implementing a function jump according to an embodiment of this application.

An embodiment of this application provides an apparatus 800 for implementing a function jump. As shown in FIG. 16, the apparatus includes a receiving unit 801 and a processing unit 802. The receiving unit 801 is configured to perform steps S501 or S701. The processing unit is configured to perform one or more of steps S502 to S504, one or more of steps S601 to S607, one or more of steps S702 to S707, or one or more of steps S708 to S714.

An embodiment of this application provides a computer system. The computer system includes a memory and a processor. The memory is configured to store a computer program, and the processor is configured to execute the computer program to implement the method for implementing a function jump provided in any embodiment of this application.

An embodiment of this application provides a computer-readable storage medium, and a computer program is stored in the computer-readable storage medium. When the computer program is called by a processor, the method for implementing a function jump provided in any embodiment of this application is performed.

An embodiment of this application provides a computer program product, and the computer program product includes a computer program. When the computer program is called by a processor, the method for implementing a function jump provided in any embodiment of this application is performed.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a compact disc ROM (CD-ROM), an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

It is clearly that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method for implementing a function jump, wherein the method comprises:

receiving, a call instruction for a first function;

confirming that a first address of the first function is stored in a first data structure, wherein the first data structure stores addresses of a plurality of functions including the first address;

searching, based on the first address, a second data structure for a second address of a first patch function of the first function, wherein the first patch function is registered to replace the first function, wherein the second data structure stores correspondences between the addresses and patch functions of the functions including the first patch function, wherein each of the functions corresponds to a second struct, wherein a third address of a second patch function of each of the functions is stored in the second struct, and wherein a second hash table is configured to store correspondences between the addresses and a plurality of second structs of the functions;

jumping, based on the second address, from the first function to the first patch function;

executing, in response to the call instruction, the first patch function;

searching, in response to receive a rollback instruction for the first function and based on the second hash table and the first address, for the second address in the second struct corresponding to the first function, wherein the rollback instruction instructs to undo replacement of the first function with the first patch function; and deleting the second address.

2. The method of claim 1, wherein the first data structure is a first hash table.

3. The method of claim 2, further comprising determining the first hash table using a struct, wherein the struct stores a fourth address of the first hash table, and wherein a pointer pointing to the struct is in a first struct.

4. The method of claim 3, further comprising adding the first address to the first hash table.

5. The method of claim 1 further comprises:

searching, based on the first address, the second hash table for a second struct corresponding to the first address; and obtaining, from the second struct corresponding to the first address, the second address.

6. The method of claim 1, further comprising adding the first address to the first data structure.

7. A computer system comprising:
a memory configured to store a computer program; and
a processor coupled to the memory, wherein the computer program causes the processor to be configured to:
receive a call instruction for a first function;
confirm that a first address of the first function is stored in a first data structure, wherein the first data structure stores addresses of a plurality of functions including the first address;
search, based on the first address, a second data structure for a second address of a first patch function of the first function, wherein the first patch function is registered to replace the first function, wherein the second data structure stores correspondences between the addresses and patch functions of the functions including the first patch function, wherein each of the functions corresponds to a second struct, wherein a third address of a second patch function of each of the functions is stored in the second struct, and wherein a second hash table is configured to store correspondences between the addresses and a plurality of second structs of the functions;
jump, based on the second address, from the first function to the first patch function;
execute, in response to the call instruction, the first patch function;
search, in response to receive a rollback instruction for the first function and based on the second hash table and the first address, for the second address in the second struct corresponding to the first function, wherein the rollback instruction instructs to undo replacement of the first function with the first patch function; and
delete the second address.

8. The computer system of claim 7, wherein the first data structure is a first hash table.

9. The computer system of claim 8, wherein the computer program further causes the processor to be configured to determine the first hash table using a struct, wherein the struct stores a fourth address of the first hash table, and wherein a pointer pointing to the struct is in a first struct.

10. The computer system of claim 9, wherein the computer program further causes the processor to be configured to add the first address to the first hash table.

11. The computer system of claim 7 further causes the processor to be configured to:
search, based on the first address, the second hash table for a second struct corresponding to the first address; and
obtain, from the second struct corresponding to the first address, the second address.

12. The computer system of claim 7, wherein the computer program further causes the processor to be configured to add the first address to the first data structure.

13. A computer program product comprising computer-executable instructions stored on a non-transitory computer-readable storage medium that, when executed by a processor, cause an apparatus to:
receive a call instruction for a first function;
confirm that a first address of the first function is stored in a first data structure, wherein the first data structure stores addresses of a plurality of functions including the first address;
search, based on the first address, a second data structure for a second address of a first patch function of the first function, wherein the first patch function is registered to replace the first function, wherein the second data structure stores correspondences between the addresses and patch functions of the functions including the first patch function, wherein each of the functions corresponds to a second struct, wherein a third address of a second patch function of each of the functions is stored in the second struct, and wherein a second hash table is configured to store correspondences between the addresses and a plurality of second structs of the functions;
jump, based on the second address, from the first function to the first patch function;
execute, in response to the call instruction, the first patch function;
search, in response to receive a rollback instruction for the first function and based on the second hash table and the first address, for the second address in the second struct corresponding to the first function, wherein the rollback instruction instructs to undo replacement of the first function with the first patch function; and
delete the second address.

14. The computer program product of claim 13, wherein the first data structure is a first hash table.

15. The computer program product of claim 14, wherein the computer-executable instructions further cause the apparatus to determine the first hash table using a struct, wherein the struct stores a fourth address of the first hash table, and wherein a pointer pointing to the struct is in a first struct.

16. The computer program product of claim 13, wherein the computer-executable instructions further cause the apparatus to:
search, based on the first address, the second hash table for a second struct corresponding to the first address; and
obtain, from the second struct corresponding to the first address, the second address.

17. The computer program product of claim 14, wherein the computer-executable instructions further cause the apparatus to add the first address to the first data structure.

* * * * *